US010521864B1

(12) United States Patent
Davis

(10) Patent No.: US 10,521,864 B1
(45) Date of Patent: Dec. 31, 2019

(54) SYSTEMS AND METHODS FOR USING TOKENIZED ICONS TO PROVIDE INSURANCE POLICY QUOTES

(71) Applicant: State Farm Mutual Automobile Insurance Company, Bloomington, IL (US)

(72) Inventor: Timothy Joel Davis, Chicago, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 562 days.

(21) Appl. No.: 15/234,892

(22) Filed: Aug. 11, 2016

Related U.S. Application Data

(60) Provisional application No. 62/339,646, filed on May 20, 2016.

(51) Int. Cl.
*G06Q 40/08* (2012.01)
*G06Q 50/18* (2012.01)
*G06F 3/0481* (2013.01)

(52) U.S. Cl.
CPC ............ *G06Q 40/08* (2013.01); *G06Q 50/18* (2013.01); *G06F 3/04817* (2013.01)

(58) Field of Classification Search
CPC .................................................. G06Q 40/08
USPC ........................................................... 705/4
See application file for complete search history.

(56) References Cited

U.S. PATENT DOCUMENTS

| 8,760,285 B2 | 6/2014 | Billman et al. |
| 2006/0004612 A1 | 1/2006 | Chewning et al. |
| 2010/0138359 A1 | 6/2010 | Alter |
| 2013/0290036 A1* | 10/2013 | Strange .................. G06Q 40/08 705/4 |
| 2014/0114794 A1 | 4/2014 | Wolf |
| 2016/0104245 A1 | 4/2016 | Alter |
| 2018/0315127 A1* | 11/2018 | Chappell ................ G06Q 40/08 |

* cited by examiner

*Primary Examiner* — Hao Fu
(74) *Attorney, Agent, or Firm* — Armstrong Teasdale LLP

(57) ABSTRACT

An insurance server for using a tokenized icon to provide an insurance quote or submit an insurance claim may include a processor programmed to receive an image from a user application, and data associated with the image, wherein at least a portion of the obtained data is associated as metadata with the tokenized icon. The processor may instruct the user application to use an icon associated with the tokenized icon as a first graphical object, and to modify, in response to an association of the first graphical object with a second graphical object in the user application, the metadata of the tokenized icon based upon data associated with the second graphical object. The processor may transmit the virtual quote or proposed insurance claim to the user application, the virtual quote or proposed insurance claim being based upon the modified metadata. As a result, the online customer experience may be enhanced.

20 Claims, 12 Drawing Sheets

SYSTEMS AND METHODS FOR USING TOKENIZED ICONS TO PROVIDE INSURANCE POLICY QUOTES

CROSS-REFERENCE TO RELATED APPLICATIONS

This application claims priority to U.S. Provisional Patent Application Ser. No. 62/339,646, filed May 20, 2016, the contents of which are hereby incorporated by reference, in their entirety and for all purposes, herein.

FIELD OF THE INVENTION

The present disclosure relates to a system that associates metadata with icons to create tokenized icons, and that enables a user to generate insurance quotes, purchase an insurance policy, modify an insurance policy, and/or submit a claim under an insurance policy by manipulating the tokenized icons.

BACKGROUND

When a person wishes to insure an insurable asset, such as a home or vehicle, against damage, the person may request a quote for an insurance policy. The insurance policy may be designed to disburse a claim amount to an owner of the insurance policy when the asset is damaged. The amount of the claim disbursement paid to the owner may correspond to an amount of damage, a nature of the damage, and/or an estimated cost to repair the damage, compared to a pre-insured value of the asset (or a value of the asset established during a quote process before the insurance policy is purchased). A cost for the insurance policy may depend on a number of factors which may include, but are not limited to including, an age of the asset, personal characteristics of an owner of the asset and other potential users of the asset, primary geographic location of the asset, types and causes of damage insured against, and amount of insurance coverage. If a person wishes to submit a claim under the insurance policy to recover damage or other loss affecting the insured asset, it may be necessary for the person to provide information about the damage and/or an incident that led to the damage.

At least some known systems may require a user seeking an insurance quote, or a user seeking to purchase or modify an insurance policy, or a user seeking to submit a claim under an insurance policy, to manually input at least some of the associated data into a software platform configured to prepare a quote, issue a policy, or handle a claim for an insurable asset. Needless to say, the entire data entry process may be time-consuming and laborious. For example, but not by way of limitation, a user may wish to request a quote for, purchase, or modify a policy, or submit a claim under a policy, using a mobile device, such as a smart phone, and entry of data via typing on the mobile device interface may be cumbersome. Any reduction in the time and/or labor involved in the process of requesting a quote for, purchasing, or modifying an insurance policy, or submitting a claim under an insurance policy, may be desirable.

BRIEF SUMMARY

The present embodiments may relate to systems and methods for using a tokenized icon to provide a quote for an insurance policy, or to handle an insurance claim. An insurance server computing device, as described herein, may include an insurer application that includes at least one processor in communication with a memory. The insurance server computing device may be configured to implement various software applications or platforms to generate tokenized icons. An icon associated with each tokenized icon may be used in a graphical interface of a user application executed on a remote user device. The insurer application may be configured to modify metadata associated with the tokenized icons based upon reports received from the user application with regard to a user's manipulation of the icons. The insurer application may be configured to generate one or more insurance quotes and/or a proposed virtual insurance claim requested by the user application based upon the modified metadata.

In one aspect, an insurance server (or computer system) for using a tokenized icon to provide a quote for an insurance policy may be provided. The insurance server may include at least one processor in communication with a memory. The at least one processor may be programmed to receive an image from a user application in connection with a request for a quote for an insurance policy. The at least one processor may also be programmed to obtain data associated with the image, wherein at least a portion of the obtained data is associated as metadata with the tokenized icon. The at least one processor may also be programmed to instruct the user application to use an icon associated with the tokenized icon as a first graphical object. The at least one processor may also be programmed to modify, in response to an association of the first graphical object with a second graphical object in the user application, the metadata of the tokenized icon based upon data associated with the second graphical object. The at least one processor may also be programmed to transmit the quote to the user application, wherein the quote is based at least partially on the modified metadata. The server or computer system may include additional, less, or alternate functionality including that discussed elsewhere herein.

In another aspect, a computer-implemented method for using a tokenized icon to provide a quote for an insurance policy may be provided. The method may be implemented using an insurance server including a processor in communication with a memory. The method may include (1) receiving an image from a user application in connection with a request for a quote for an insurance policy; and (2) obtaining data associated with the image, wherein at least a portion of the obtained data is associated as metadata with the tokenized icon. The method may also include (3) instructing the user application to use an icon associated with the tokenized icon as a first graphical object; and (4) modifying, in response to an association of the first graphical object with a second graphical object in the user application, the metadata of the tokenized icon based upon data associated with the second graphical object. The method may also include (5) transmitting the quote to the user application, wherein the quote is based at least partially on the modified metadata. The method may include additional, less, or alternate actions, including those discussed elsewhere herein, and may be implemented via one or more local or remote processors.

In yet another aspect, at least one non-transitory computer-readable storage media having computer-executable instructions embodied thereon may be provided. When executed by an insurance server including at least one processor in communication with a memory, the computer-executable instructions may cause the at least one processor to receive an image from a user application in connection with a request for a quote for an insurance policy. The computer-executable instructions may also cause the at least one processor to obtain data associated with the image, wherein at least a portion of the obtained data is associated as metadata with a tokenized icon. The computer-executable instructions may also cause the at least one processor to instruct the user application to use an icon associated with the tokenized icon as a first graphical object. The computer-executable instructions may also cause the at least one processor to modify, in response to an association of the first graphical object with a second graphical object in the user application, the metadata of the tokenized icon based upon data associated with the second graphical object. The computer-executable instructions may also cause the at least one processor to transmit the quote to the user application, wherein the quote is based at least partially on the modified metadata. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
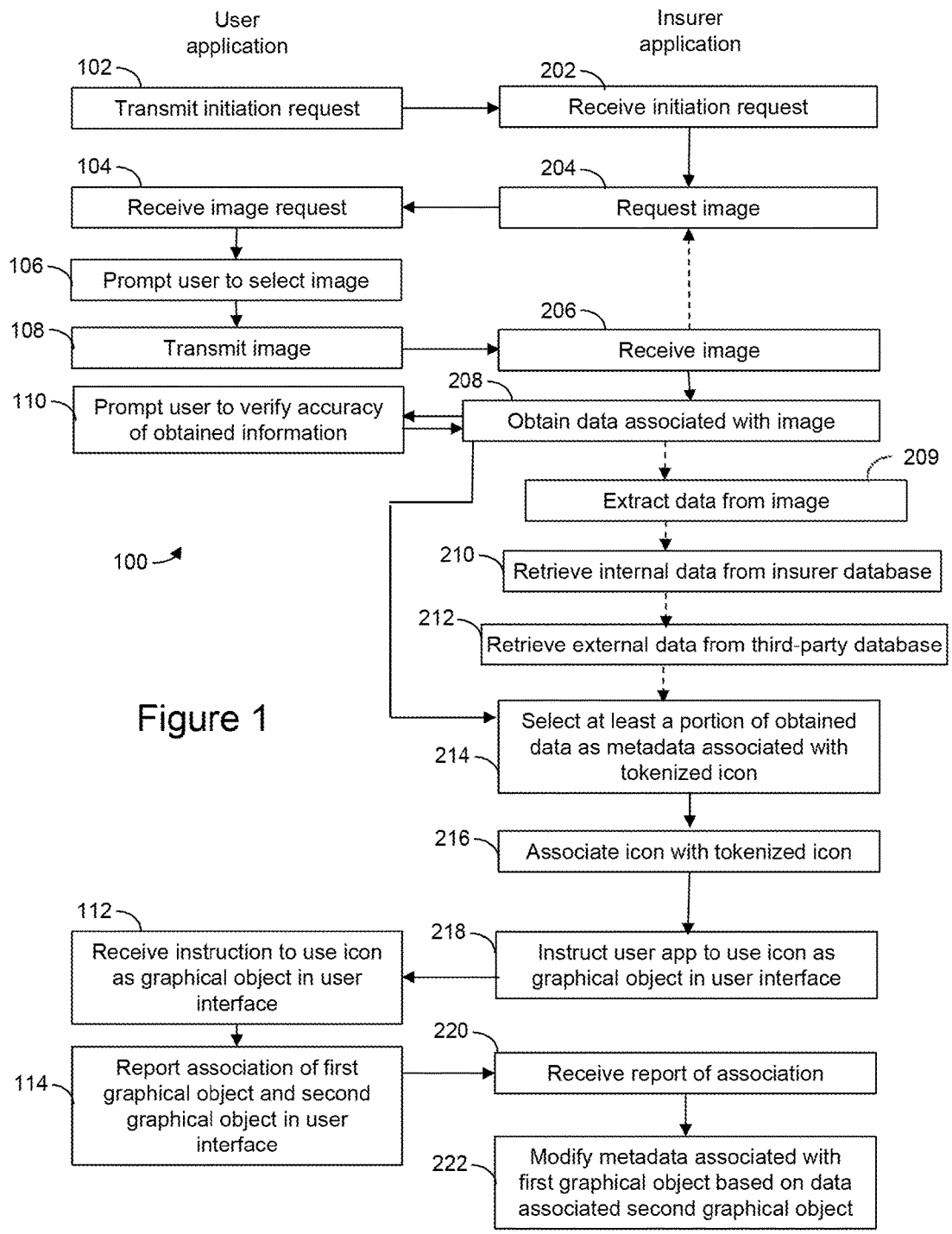
FIG. 1 depicts a schematic view of an exemplary computer-implemented method for using a tokenized icon to provide, from an insurer application, a quote for an insurance policy to a user application.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for using a tokenized icon to provide a quote (or handle an insurance claim) for an insurance policy. A tokenized icon refers to an association, within a computer system, of metadata with an image. The image may be used as an icon in a graphical user interface of a computer application. The metadata associated with the tokenized icon may be modified by the computer system based upon a user's manipulation of the icon in the graphical user interface. The computer system may be an insurance server computing device configured to provide a quote (or a proposed virtual insurance claim) for an insurance policy to a remote user device that implements the graphical user interface. The insurance server computing device may include at least one processor in communication with a memory. In some embodiments, the memory may include one or more storage devices, including cloud storage devices, internal memory devices, non-centralized databases, and/or combinations thereof. The user device may also include at least one processor in communication with a memory, such as a mobile device.

Although the computer-implemented method for using a tokenized icon to provide a quote, or generate a proposed virtual insurance claim, for an insurance policy is described herein as being performed by a single insurance server computing device, it should be understood that more than one computing device may perform the various actions and steps described herein as performed by the insurance server computing device. For example, certain steps of the method may be alternatively performed by the user application on the remote user device without departing from the scope of the present disclosure.

In one exemplary embodiment, a user (e.g., a homeowner, vehicle owner, or other user associated with an insurable asset) may access an insurer application or platform via a user application executed on a user computing device. The user computing device may include, for example, a mobile phone, a smart phone, a tablet, a laptop computer, other mobile device, etc. In the exemplary embodiment, the user computing device may be a mobile computing device, such that ease of data entry by the user is reduced due to the absence of a full keyboard and/or pointer device.

Accordingly, the insurer application and user application may be configured to facilitate entry of data related to a quote for an insurance policy using tokenized icons. For example, the insurer application may be configured to generate tokenized icons representative of vehicles, persons, homes, personal property (e.g., jewelry, appliances, etc.), and/or other suitable subjects, as described further herein. The insurer application may instruct the user to provide an informative image as a basis for a tokenized icon.

For example, the image may be a photograph of the user's driver's license, a photograph of a Vehicle Identification Number (VIN) plate of a vehicle, a photograph of the vehicle itself, a photograph of other personal property, or another suitable image. The user may acquire the photograph contemporaneously using a camera function of the user device, or alternatively may select an existing image stored, for example, in the memory of the user device or on the Internet.

The insurer application may obtain data associated with the image received from the user application. The insurer application may use the obtained data instead of, for example, obtaining typed answers to a series of questions via the user application. Thus, the use of tokenized icons may improve a user experience in obtaining a virtual insurance quote, and/or submitting or reviewing a virtual insurance claim, using the user device, such as by reducing an amount of time, data entry effort, and data correction required from the user. The insurer application may obtain data associated with the image by one or more of extraction of text and numeric data directly from the image, retrieval of internal data from an insurer database based upon the extracted data and/or other inputs provided by the user via the user application, and retrieval of external data from at least one third-party database based upon the extracted data and/or other inputs provided by the user via the user application. The insurer application and user application may cooperate to prompt the user to verify the accuracy of the obtained data.

The insurer application may select at least a portion of the obtained data to associate as metadata with a tokenized icon. The selected portions may be selected based upon at least one of a type or content of certain data fields included in at least one of the extracted data, the internal data, the external data, additional data received from the user application, such as name of the user, driver's license number of the user, existing or previous insurance policies associated with the user, known vehicles or other personal property assets associated with the user, VIN of a vehicle of the user, existing or previous insurance policies associated with the VIN, individuals associated with the VIN, telephone numbers and/or email addresses associated with the user, additional addresses (such as insured properties or homes) associated with the user, property tax and/or other real estate data associated with any address of the user, a credit rating and/or credit history of the user, other public records associated with the user, other individuals associated with an address of the user that potentially could be relevant to (i) a quote on a new or modified insurance policy or (ii) handling a virtual insurance claim—either prepared by the user's mobile device, or remotely prepared by an insurance provider remote server for the user's review and approval via their mobile device, and/or any other suitable portion of the obtained data. The data and/or data fields may also include information or images related to damaged insured vehicles, homes, apartments, personal articles, or other insured assets.

The insurer application also may associate an icon with the tokenized icon. In some embodiments, the insurer application may select at least a portion of the image received from the user application, or alternatively a stock image, as the icon to associate with the tokenized icon. The icon may be selected to be a driver's license photograph extracted from a received image of the user's driver's license, a received photograph of personal property, a received photograph of a vehicle or VIN plate of a vehicle, a stock image of a vehicle associated with a VIN, a stock image of a person, a stock image of a type of personal property (e.g. jewelry), or another suitable image. The insurer application may instruct the user application to use the icon as a first graphical object in a user interface of the user application. In some embodiments in which the icon is selected to be at least a portion of the received image, the user application may be configured to retrieve from a memory of the user device the image previously transmitted. In other embodiments in which the icon is selected to be at least a portion of the received image, or alternatively selected to be a stock image, the insurer application may transmit the icon to the user application for use as the first graphical object.

In some embodiments, the insurer application may receive a plurality images, and may generate a corresponding plurality of tokenized icons. Additionally or alternatively, the insurer application may associate obtained data from a plurality of received images with a single tokenized icon.

The user interface of the user application may enable the user to associate graphical objects with each other, such as by drag-and-drop or button operations, to communicate information relating to the insurance quote to the insurer application. Each of the graphical objects may be associated with a respective set of metadata through a respective tokenized icon, or alternatively the graphical objects may have any suitable associated data structure and/or be generated in any suitable fashion. At least a portion of the metadata associated with at least one tokenized icon may be used by the insurer application to generate the requested quote for an insurance policy. For example, the user application may report an association in the user interface of a first graphical object and a second graphical object to the insurer application, and the insurer application may, in response, modify metadata associated with the first graphical object based upon data associated with the second graphical object. The association of the first and second graphical objects may be, for example, a drag and drop operation or control button operation by the user. The association of the first and second graphical objects may indicate a role and/or relationship of an individual to the property to be insured, a selection of an insurance policy parameter relevant to generation of a quote, such as a selected deductible amount, a selected coverage amount, a selected policy option or rider, or other suitable insurance policy parameter, or any other information relevant to generation of a quote for an insurance policy.

For example, a first tokenized icon may represent a vehicle and a second tokenized icon may represent an individual. A user may drag and drop a second graphical object, an extracted driver's license photograph as the icon of the second tokenized icon, onto a first graphical object, a stock image of a vehicle as the icon of a first tokenized icon. In response, the insurer application may modify a metadata field of the first tokenized icon that represents, for example, an owner, a primary driver, or a secondary driver of the vehicle, to list the individual represented by the second tokenized icon.

For another example, a first tokenized icon may represent a home and a second tokenized icon may represent an individual. A user may drag and drop a second graphical object, a stock image of a person as the icon of the second tokenized icon, onto a first graphical object, a stock image of a home as the icon of a first tokenized icon. In response, the insurer application may modify a metadata field of the first tokenized icon that represents, for example, an owner or a resident of the home, to list the individual represented by the second tokenized icon.

In certain embodiments, one of the graphical objects may not be associated with a tokenized icon. For example, a first tokenized icon may represent a vehicle. A user may drag and drop a first graphical object, a stock image of a vehicle as the icon of a first tokenized icon, onto a second graphical object that is a map. In response, the insurer application may modify a metadata field of the first tokenized icon that represents, for example, a garage address of the vehicle, to list the address represented by the drop location on the map.

In some embodiments, association of the first and second graphical objects may enable the user to complete a purchase of the quoted insurance policy. For example, a first tokenized icon may represent a user's electronic signature authorization and the second graphical object may represent an authorization button. A user may select the second graphical object in proximity to a first graphical object, an extracted driver's license signature of the user as the icon of a first tokenized icon. In response, the insurer application may modify a metadata field of the first tokenized icon that indicates that the user applied electronic signature authorization to purchase the quoted policy. In addition, the insurance policy may be generated and stored within the insurance server computing device as a template including a plurality of data fields. At least some of the data fields may be updated based on modified metadata of the first tokenized icon. For example, if the insurance policy is purchased for a vehicle or other insurable item, the insurance policy may be updated with the metadata to include information associated with the vehicle. The insurance policy may also be updated using metadata when an insurance claim is generated and/or handled.

In certain embodiments, the insurer application may store the images obtained from the user and provide the images to the user device in subsequent interactions with the user, thereby personalizing the experience of the user in interacting with the insurance server. The images may include images of homes, home features, personal articles, vehicles, and other insurance assets, such as before or after an insurance-related event, e.g., fire, smoke, water, wind, or hail events.

In some embodiments, the insurer application may store a photograph of the user obtained as the image from the user, and may subsequently provide the photograph of the user to agents of the insurer to facilitate recognition of the user during in-person interactions.

In certain embodiments, the insurer application may store the signature of the user extracted from, for example, an image of a driver's license, for comparison to subsequent signatures nominally provided by the user, as a fraud-detection measure.

At least one of the technical problems addressed by this system may include: (i) time-consuming, difficult, and/or laborious manual entry of data using a user computing device, such as, but not limited to, a mobile user device such as a smart phone or tablet; (ii) inability to obtain quotes on insurance policies at a time and from a location convenient to the user; (iii) ease of submitting, preparing, or reviewing insurance claims, and/or (iv) low quality online customer experience due to impersonal feel of electronic interfaces.

A technical effect of the systems and processes described herein may be achieved by performing at least one of the following steps: (a) receiving an image from a user application in connection with a request for a quote for an insurance policy, or submitting an insurance claim for the insurance policy; (b) obtaining data associated with the image, wherein at least a portion of the obtained data is associated as metadata with a tokenized icon; (c) instructing the user application to use an icon associated with the tokenized icon as a first graphical object; (d) modifying, in response to an association of the first graphical object with a second graphical object in the user application, the metadata of the tokenized icon based upon data associated with the second graphical object; and/or (e) transmitting the quote to the user application or a proposed insurance claim, wherein the quote or proposed insurance claim is based at least partially on the modified metadata.

The technical effect achieved by this system may be at least one of: (i) reduced time and effort required of the user to obtain an insurance quote, or submit an insurance claim; (ii) increased accuracy of underlying data used to generate an insurance quote or a virtual insurance claim; (iii) ability to obtain quotes or submit claims on insurance policies at a time and from a location convenient to the user; and (iv) provision of a personalized user interface to improve the online customer experience.

An Approach to Solve the Problem

A method of capturing information and re-using graphical representations of that information in a mobile application for quoting insurance, transacting changes on a policy, and handling claims may have utility in addressing the problems described above. A mobile device may capture a photo of a Driver's License, with information being imported into the quoting application using character recognition, including the customer's photo and signature. The information captured may be used as input to eligibility decisions (for example: date of birth, risk location, expired license, class of license), as well as input to the retrieval of other quote-relevant data (consumer reports, rating characteristics, etc.).

Of primary importance for this idea is the graphical re-use of those elements to simplify the quoting process, in particular, the tokenization of the image(s) captured from the Driver's License(s) of the driver(s) applying for coverage. These images may be used as icons, which may be dragged to different on-screen positions to indicate the answers to quote/application questions, without forcing the user to type words to the same effect. For example, an icon of the driver's photo could be tapped and dragged to a position above the driver's side of a picture of a vehicle, indicating a Principle Operator role. Other photos being dragged to different parts of the screen may indicate other roles, such as Owner and Occasional Driver.

Similarly, icons of multiple cars in the same household and/or on the same policy may be positioned on a map to show relative location of garaging address or similarly, dragged within close proximity of known addresses for a given Customer, indicating which vehicles belong primarily at which garaging address. As an additional enhancement, a photo of the vehicle itself may be used in a similar way (as key to replacement cost, vehicle history, etc. as well as a photo icon to use in the quoting process).

Similarly, other, non-photographic pieces of information may also be treated as icons rather than words, that would then be used in a drag-and-drop way to indicate Customer preferences, answers to questions, coverages desired, etc. For example, types of insurance coverages may be represented as icons, and dragged on top of a car to show that the Customer desired to quote with those coverages (it should be noted that this applies to Policy Change/Service scenarios, as well as Acquisition). Social media profiles may be used as a starting place for this same process, with photos and other information re-used in a tokenized manner in this quoting process.

In one embodiment, a Customer's household may be represented as avatar icons, even in absence of photos on which to base those avatars (generic son or daughter icons, etc.). Icons representing personal belongings (big ticket items) or the general quality grade of a room or whole home may be used instead of textual input on the same topics—such as for quote generation or claim submission/handling.

In a further enhancement, the icon used to answer questions in a quote/application process may be treated as a "container" of information associated to the icon, such that additional logic could be run on that "hidden" information when an icon was used to answer an application question. For example, an icon of a driver may be "embedded" with driver's license information and loss information associated with that driver, such that dragging the icon into a certain position on a graphical field to imply Principal Operator status, the information embedded with that icon may be used, behind the scenes, to answer related questions. For example, the date of birth for a particular driver could be evaluated for eligibility and rating purposes (too young to drive, or young enough to rate higher, etc.) when the icon associated with the driver is dragged and dropped into a position implying their driver role on a policy/for a vehicle.
Exemplary Method of Using a Tokenized Icon for Quote Generation or Claim Handling FIG. 1 depicts a schematic view of an exemplary embodiment of a method 100 for using a tokenized icon to provide, from an insurer application, a quote for an insurance policy to a user application. In certain embodiments, the insurer application may be implemented on an insurance server computing device 702 (shown in FIG. 6), as will be described herein. Alternatively, the insurer application may be implemented using any suitable hardware. Moreover, in certain embodiments, the user application may be implemented on a remote user computing device 802 (shown in FIG. 7), as will be described herein. In particular, in some such embodiments, the user application may be implemented on a mobile user device, such as, but not limited to, a smart phone, a tablet, wearable, smart contract, laptop, or other mobile device. Alternatively, the user application may be implemented using any suitable hardware.

In one exemplary embodiment of method 100, the user application may transmit 102 an initiation request to the insurer application. For example, the user application may enable a user to request a quote on a new or modified insurance policy by clicking on a "Request Quote" link on an insurer web page or, if the user application is a dedicated application, by clicking on a "Request Quote" button on the user application. In certain embodiments, the user application also may transmit log-in credentials or other identification data to the insurer application. For example, the user may be an existing customer of the insurer or may have otherwise previously registered for electronic interaction with the insurer, and thus may have previously acquired log-in credentials associated with the insurer. For another example, the user application may prompt the user to enter a name or other identification data.

In other embodiments, the user application may not transmit log-in credentials or other identification data. For example, the insurer application may derive identification data associated with the user from an image transmitted by the user, as described below.

In one exemplary embodiment, the insurer application may receive 202 the initiation request from the user application. In response to the initiation request, the insurer application may request 204 an image from the user application. The user application may receive 104 the image request from the insurer application. For example, the insurer application may request a photograph of the user's driver's license. For another example, the insurer application may request a photograph of an item of personal property, such as jewelry or other personal articles, for which the user is seeking a quote for a new or modified insurance policy. For another example, the insurer application may request a photograph of a vehicle for which the user is seeking a quote for a new or modified insurance policy. For another example, the insurer application may instruct the user to send a photograph of a Vehicle Identification Number (VIN) of the vehicle for which the user is seeking a quote for a new or modified insurance policy.

In response to the image request, the user application may prompt 106 the user to select an image. For example, the user application may prompt the user to switch to a camera application on the user device and photograph, for example, the user's driver's license. The user application may then provide a picture browsing window that permits the user to select the driver's license photograph from a selected storage location associated with the camera application on the user device. For another example, the user application may initiate an instance of a camera application on the user device and prompt the user to photograph, for example, the user's driver's license, and the user application may automatically capture the photograph returned by the camera application.

In one exemplary embodiment, the user application also may transmit 108 the image to the insurer application. More specifically, the user application may transmit an image captured by, and/or selected from, the user device in response to the image request from the insurer application. The insurer application may receive 206 the image transmitted by the user application in connection with the request for a quote for an insurance policy. In certain embodiments, the request for an image in step 204 may be associated with the instructions for requesting a quote in the user application, such that transmission of the image in step 108 may also constitute transmitting the initiation request in step 102. For example, the insurer application executed on an insurer web page may initially instruct the user to send a photograph of the VIN of a vehicle in order to initiate a process to receive a quote for a new or modified insurance policy covering the vehicle, thereby combining steps 102, 202, 104, 204, 106, 108, and 206.

In some embodiments, upon receipt of the image in step 206, the insurer application may return to step 204 to request another image, and steps 104, 106, 108, and 206 may be repeated. For example, the user may request a quote for an insurance policy for a vehicle in step 102, the insurer application may request a photograph of the user's driver's license in step 204, and after receipt of the user's driver's license photo in step 206, the insurer application may return to step 204 and request a photograph of the vehicle or the VIN of the vehicle. The insurer application may return to step 204 any suitable number of times.

Figure 2:
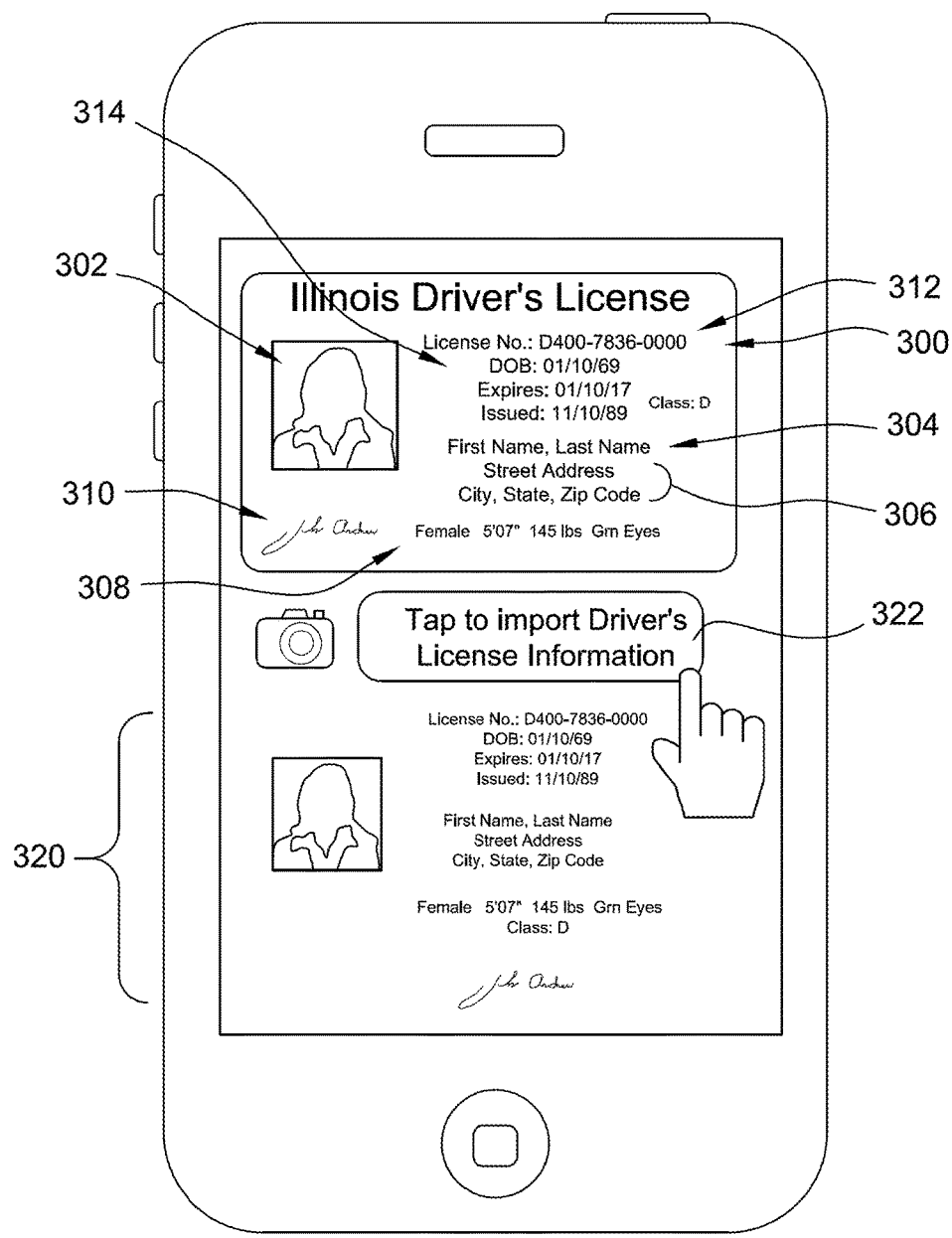
FIG. 2 depicts a schematic view of an exemplary embodiment of obtaining data by extraction from an image in certain embodiments of the method shown in FIG. 1.

In certain embodiments, the insurer application may obtain 208 data associated with the image. For example, the insurer application may extract 209 data, such as text- or image-based data, directly from the image. One non-limiting example embodiment of obtaining 208 data by extraction 209 from the image is illustrated in FIG. 2. In the illustrated example, the received image is a photograph of the user's driver's license 300. With reference to FIGS. 1 and 2, the insurer application may extract 209 data including at least one of a personal photograph 302, a name 304, an address 306, a gender 308, a signature 310, a license number 312, and a date of birth 314. For another example, the image is a photograph of personal property, and the insurer application may extract 209 an image of the personal property from a background of the photograph. For another example, the image is a photograph of a vehicle, and the insurer application may extract 209 an image of the vehicle from a background of the photograph. For another example, the image is a photograph of a VIN plate of a vehicle, and the insurer application may extract 209 the VIN, in text format, from the photograph of the VIN plate.

Alternatively, the user application, rather than the insurance application, may obtain 208 data by extraction 209 from the image and transmit the extracted data to the insurer application. The insurer application and/or the user application may use any suitable method to extract 209 data, such as image and/or textual data, from the image.

Additionally or alternatively, the insurer application may obtain 208 data associated with the image by retrieving 210 internal data from an insurer database based upon the extracted data and/or other inputs provided by the user via the user application. More specifically, the insurer application may search the insurer database for records associated with the provided data, and retrieve internal data associated with the user or the asset that is the subject of the user's insurance quote request. For example, the insurer application may search for name 304, address 306, license number 312, and/or date of birth 314 in the insurer database, may determine that the user is a current customer of the insurer or has had prior dealings with the insurer, and may retrieve internal data associated with the user.

In some such embodiments, the insurer application may retrieve a record of an existing insurance policy with the insurer, and may instruct the user application to ask the user if the user desires to make a change to the existing policy. For another example, the insurer application may search for a VIN extracted from a received image that is a VIN photograph in the insurer database, may retrieve a record indicating that the vehicle associated with the VIN has been covered under a previous or existing insurance policy with the insurer, and may later use information associated with the previous or existing policy in adjusting a premium rate in an insurance quote offered to the user, as will be described herein.

Additionally or alternatively, the insurer application may obtain 208 data associated with the image by retrieving 212 external data from at least one third-party database based upon the extracted data and/or other inputs provided by the user via the user application. For example, the insurer application may search for name 304, address 306, license number 312, and/or date of birth 314 in the at least one third-party database, and may verify an accuracy of address 306, may verify an accident history and/or credit history of the user, and/or may retrieve other external data associated with the user in the at least one third-party database. For another example, the insurer application may search for a VIN extracted from a received image that is a VIN photograph in the insurer database, may retrieve a record indicating that the vehicle associated with the VIN has been involved in a previous accident or insurance claim, and may later use that information in adjusting a premium rate in an insurance quote offered to the user, as will be described herein.

In one exemplary embodiment, the user application may prompt 110 the user to verify the accuracy of the obtained data. For example, in the example embodiment illustrated in FIG. 2, the insurer application may transmit to the user application the personal photograph 302, name 304, address 306, gender 308, signature 310, license number 312, and date of birth 314 extracted from the received image, and the user application may display the obtained data to the user in a region 320 of a display of the user device.

The user may have the option to verify the accuracy of the information by selecting an "import" button 322, or to edit the obtained data by tapping the region 320. If the user edits the obtained data, the user application may then transmit the updated data back to the insurer application. In certain embodiments, an ability to obtain data from the received image reduces an amount of typing and/or other user steps that typically would be necessary to enter information such as the user's name, address, gender, signature, license number, and date of birth via the user application. Thus, example method 100 facilitates an improved user experience in activities such as requesting a quote on a new or modified insurance policy.

In one exemplary embodiment, the insurer application may select 214 at least a portion of the obtained data to associate as metadata with a tokenized icon. For example, the insurer application may select 214 at least one of the extracted data, the internal data, the external data, and other inputs provided by the user via the user application as metadata associated with the tokenized icon. In certain embodiments, the selected portions may be selected based upon a type or content of certain data fields included in at least one of the extracted data, the internal data, and the external data. Additionally or alternatively, the selected portions may be selected based upon data received from the user application as part of the initiation received from the user application in step 202 and/or the type of image requested from the user application in step 204.

For example, the insurer application may receive an initiation request in step 202 directed to a quote for one of a vehicular, personal property, home, or other insurance policy, and may transmit a request for an image of the user's driver's license in step 204. The insurer application may follow predetermined rules associated with insurance policy quotes to select 214, as metadata for association with the tokenized icon, predetermined portions of at least one of the extracted data, the internal data, and the external data that are relevant to providing a quote to the user.

More specifically, in some such embodiments, the insurer application may select at least one of name 304, address 306, gender 308, signature 310, license number 312, and date of birth 314 from the extracted data as metadata for the tokenized icon. Additionally or alternatively, the insurer application may determine that the internal data retrieved from the insurer database reflects a name, address, gender, signature, license number, and/or date of birth associated with the user that does not match name 304, address 306, gender 308, signature 310, license number 312, and/or date of birth 314, respectively. The insurer application may transmit a request to the user application to prompt the user to resolve the conflict prior to assigning values for mismatched fields to the metadata.

The insurer application may further update incorrect or outdated internal data in the insurer database. Similarly, the insurer application may determine that the external data retrieved from at least one third-party database reflects a name, address, gender, signature, license number, and/or date of birth associated with the user that does not match name 304, address 306, gender 308, signature 310, license number 312, and/or date of birth 314, respectively. The insurer application may transmit a request to the user application to prompt the user to resolve the conflict prior to assigning values for mismatched fields to the metadata. The insurer application may further report the mismatch to the third-party database that provided the relevant external data.

Additionally or alternatively, the insurer application may select 214 from the internal data as metadata for the tokenized icon additional information such as existing or previous insurance policies associated with the user, known vehicles or other personal property assets associated with the user, telephone numbers and/or email addresses associated with the user, additional addresses associated with the user, and/or known related individuals of the user that potentially could be relevant to a quote on a new or modified insurance policy.

Additionally or alternatively, the insurer application may select 214 from the external data as metadata for the tokenized icon additional information such as known vehicles or other personal property assets associated with the user, telephone numbers and/or email addresses associated with the user, additional addresses associated with the user, property tax and/or other real estate data associated with any address of the user, a credit rating and/or credit history of the user, other public records associated with the user, and/or other individuals associated with an address of the user.

For another example, the insurer application may receive an initiation request in step 202 directed to a quote for a vehicular insurance policy, and may transmit a request for an image of the VIN of the user's vehicle in step 204. The insurer application may follow predetermined rules associated with vehicular insurance policy quotes for a specified vehicle to select 214, as metadata for association with the tokenized icon, predetermined portions of at least one of the extracted data, the internal data, and the external data that are relevant to providing a quote for a vehicular insurance policy on the vehicle associated with the VIN.

More specifically, in some such embodiments, the insurer application may select 214 at least the VIN from the extracted data as metadata for the tokenized icon. Additionally or alternatively, the insurer application may select 214 from the internal data as metadata for the tokenized icon additional information such as existing or previous insurance policies associated with the VIN, individuals associated with the VIN, and information about any associated individuals similar to that described above for the user. Additionally or alternatively, the insurer application may select 214 from the external data as metadata for the tokenized icon additional information such as make and model of the vehicle associated with the VIN, individuals associated with the VIN, information about any associated individuals similar to that described above for the user, an accident/repair history of the vehicle associated with the VIN, and/or other public records associated with the VIN.

In one exemplary embodiment, the insurer application may associate 216 an icon with the tokenized icon. In some such embodiments, the insurer application may associate at least a portion of the image received in step 204 as the icon associated with the tokenized icon. For example, the insurer application may receive a photograph of the user's driver's license in step 204, and may associate 216 the extracted personal photograph 302 as the icon. For another example, the insurer application may receive a photograph of an item of personal property, such as jewelry, in step 204, and may associate 216 the photograph of the personal property as the icon. For another example, the insurer application may receive a photograph of a vehicle in step 204, and may associate 216 the photograph of the vehicle as the icon.

In other such embodiments, the insurer application may associate 216 a stock image as the icon for the tokenized icon. For example, the insurer application may receive a photograph of an item of personal property, such as jewelry, in step 204, may determine that the image may be difficult to discern as an icon-sized image, and may select a stock image representative of the personal property to associate 216 as the icon. For another example, the insurer application may receive a photograph of a Vehicle Identification Number (VIN) of a vehicle in step 204, may retrieve a make and model associated with the VIN in step 212, and may associate 216 a stock image of the vehicle make and model associated with the VIN as the icon. For another example, the insurer application may receive a photograph of the user's driver's license in step 204, may retrieve internal data identifying family and/or household members associated with the user in step 210 and/or step 212, and may associate 216 a stock image of a person as the icon to represent at least one of the family and/or household members.

It should be understood that the image selected in step 216 may be re-sized, cropped, color-adjusted, contrast-adjusted, brightness-adjusted, and/or otherwise modified and/or processed in any suitable fashion by at least one of the insurer application and the user application for use as the icon.

In one exemplary embodiment, the insurer application may instruct 218 the user application to use the icon as a first graphical object in a user interface of the user application, and the user application may receive 112 the instruction. In some embodiments in which the icon is selected to be at least a portion of the received image, the user application may be configured to retrieve from a memory of the user device the image previously transmitted in step 108. In other embodiments in which the icon is selected to be at least a portion of the received image, or alternatively selected to be a stock image, the insurer application may transmit the icon to the user application in association with the instruction of step 218 for use as the first graphical object.

In certain embodiments in which the insurer application repeats step 204 and receives a plurality of images, the insurer application may perform steps 208 through 218 as necessary for each of the images to generate a corresponding plurality of tokenized icons. Additionally or alternatively, the insurer application may associate obtained data from a plurality of received images with a single tokenized icon.

The user interface of the user application may enable the user to perform tasks associated with requesting a quote for an insurance policy. In particular, the user interface may enable the user to associate graphical objects with each other, such as by drag-and-drop or button operations, to communicate information relating to the insurance quote to the insurer application. Each of the graphical objects may be associated with a respective set of metadata through a respective tokenized icon, or alternatively the graphical objects may have any suitable associated data structure and/or be generated in any suitable fashion. At least a portion of the metadata associated with at least one tokenized icon may be used by the insurer application to generate the requested quote for an insurance policy.

In one exemplary embodiment, the user application may report 114 an association in the user interface of a first graphical object and a second graphical object to the insurer application, and the insurer application may receive 220 the report of the association and, in response, modify 222 metadata associated with the first graphical object based upon data associated with the second graphical object. For example, the user interface may display the first graphical object and the second graphical object, and the user may drag and drop the first graphical object onto the second graphical object, or vice versa, within the user interface. For another example, the user interface may display the first graphical object and the second graphical object, and the user may select a button within the user interface to associate the first graphical object and the second graphical object.

The second graphical object may be associated with another tokenized icon generated by the insurer application, or alternatively may be any suitable graphical object that enables the user application to function as described herein. For example, an association of a first graphical object and a second graphical object may indicate a role and/or relationship of an individual to the property to be insured. For another example, an association of a first graphical object and a second graphical object may indicate a selection of an insurance policy parameter relevant to generation of a quote, such as a selected deductible amount, a selected coverage amount, a selected policy option or rider, and/or any other suitable insurance policy parameter.

Figure 3:
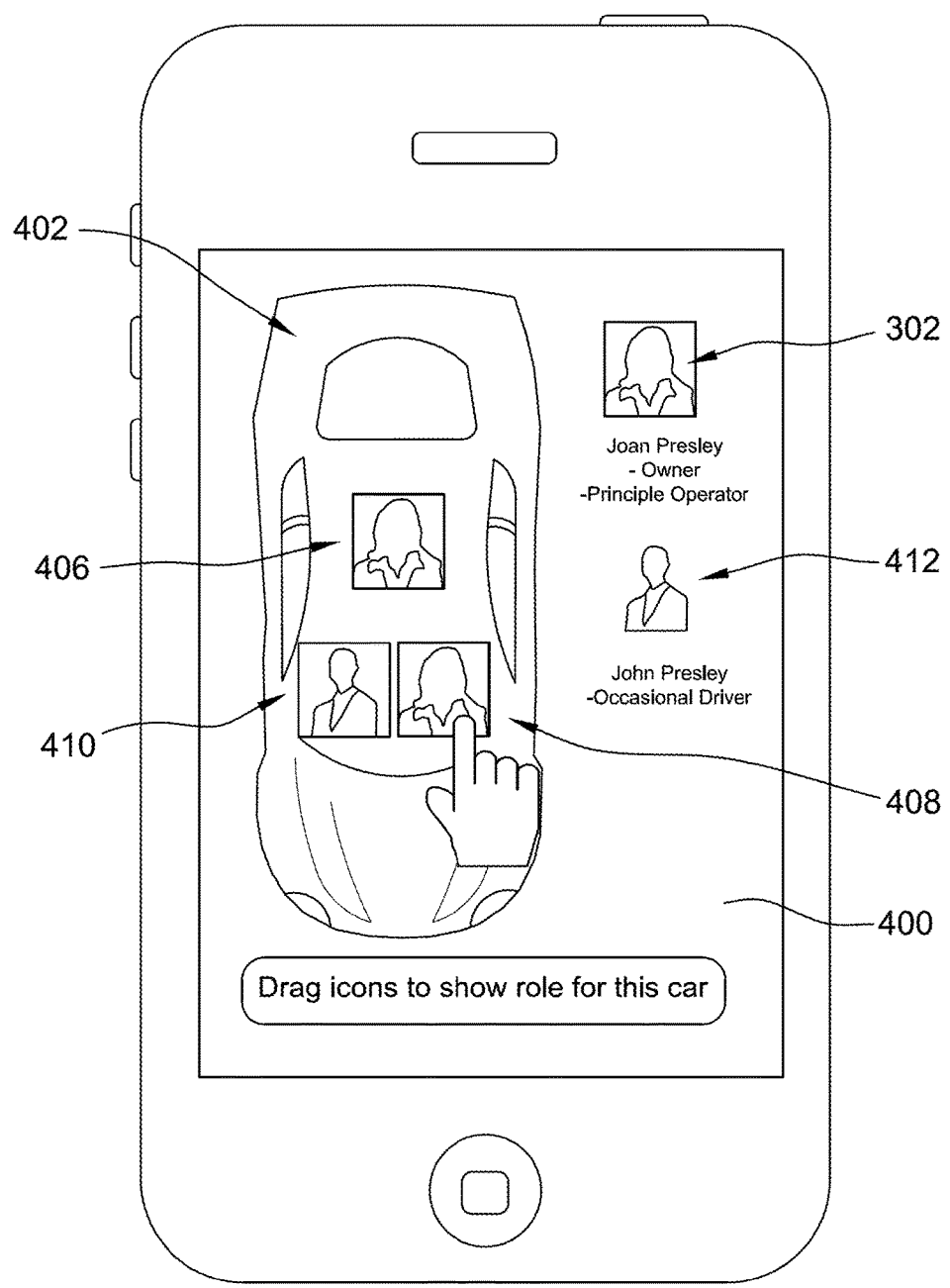
FIG. 3 depicts a schematic illustration of an exemplary embodiment of an association of a first graphical object and a second graphical object within a user interface of the user application in certain embodiments of the method shown in FIG. 1.

FIG. 3 is a schematic illustration of an exemplary embodiment of an association of a first graphical object and a second graphical object within a user interface 400 of the user application. More specifically, in the illustrated embodiment, the second graphical object may be the extracted personal photograph 302 from the user's driver's license as the icon of a second tokenized icon, and the first graphical object may be a stock image 402 of a vehicle. The stock image 402 may represent the vehicle for which a quote for an insurance policy is requested.

For example, with reference to FIGS. 1-3, the user may request a quote for an insurance policy for a vehicle in step 102, the insurer application may request a photograph of the user's driver's license in step 204 and a photograph of the VIN of the vehicle in a repeat of step 204, and the insurer application may extract the personal photograph 302 in step 209 and associate the extracted personal photograph 302 as the icon in step 216. The insurer application may also retrieve internal data in step 210 and/or external data in step 212 identifying a family or household member associated with the user, and may instruct the user application to use a stock image 412 of a person as the icon of a third tokenized icon, and may use the icon as a third graphical object to represent the identified family or household member in the user interface.

The insurer application may also identify a make and model of the vehicle based upon the VIN number in step 212, may associate the stock image 402 of the vehicle in step 216, and may instruct the user application to use the stock image 402 as the icon for the first graphical object in step 218. The first graphical object may be associated by the insurer application with a first tokenized icon that includes metadata fields for an owner of the vehicle, a primary driver of the vehicle, and at least one secondary driver of the vehicle, and the first graphical object may correspondingly include a designated owner region 406, primary driver region 408, and secondary driver region 410.

In one embodiment, the user interface of the user application may enable the user to drag and drop the extracted personal photograph 302 and the stock person image 412 into association with the stock vehicle image 402 to indicate selected values for the metadata associated with the first graphical object. For example, in the illustrated embodiment, the user may drag and drop personal photograph 302 onto the ownership region 406 and into the primary driver region 408, and may drag and drop the stock person image 412 onto the secondary driver region 410. The user application may report each drag and drop association in step 114, and the insurer application may receive each association report in step 220 and, in response, may modify the metadata associated with the stock vehicle image 402 in step 222.

In some embodiments, the insurer application may then use metadata associated with the second tokenized icon representing the user, the first tokenized icon representing the vehicle, and/or the third tokenized icon representing the associated family or household member to provide the requested quote for the insurance policy for the vehicle to the user application. For example, the insurer application may calculate a cost of the quoted insurance policy based upon details of the vehicle included in the metadata associated with the first tokenized icon, details of the user included in the metadata associated with the second tokenized icon, and/or details of the family or household member included in the metadata associated with the third tokenized icon.

Additionally or alternatively, the user interface of the user application may present additional standardized graphical objects associated with metadata that represents, for example, selectable deductible amounts, selectable coverage amounts, selectable policy options or riders such as tow truck coverage or replacement car coverage, and/or any other suitable selectable insurance policy parameters. The user may associate such parameter selection graphical objects with the stock vehicle image 402, such as by drag and drop or button operations within the user interface, and the user application may report each such association to the insurer application. The insurer application may, in response to the report of such associations, further calculate a cost of the quoted insurance policy for the vehicle based upon data associated with the standardized graphical objects.

Although the example embodiment is described above in terms of generating a quote for an insurance policy for a vehicle, it should be understood that alternative embodiments may be directed to generating a quote for an insurance policy for other personal property, a home, or any other suitable type of insurable asset. As just one example, in association with a quote for a homeowner's policy, the user may drag and drop personal photograph 302 onto an ownership region of a stock image of a home, and may drag and drop the stock person image 412 onto a resident region of the stock image of the home. Other alternative embodiments may be directed to submitting user mobile device prepared virtual insurance claims (such as via wireless communication or data transmission over one or more radio links, or wireless or digital communication channels), or for reviewing a virtual proposed insurance claim prepared by an insurance provider remote server in response to a request received from the user mobile device or receiving other data associated with an insurance-related event that causes damages to insured assets.

Figure 4:
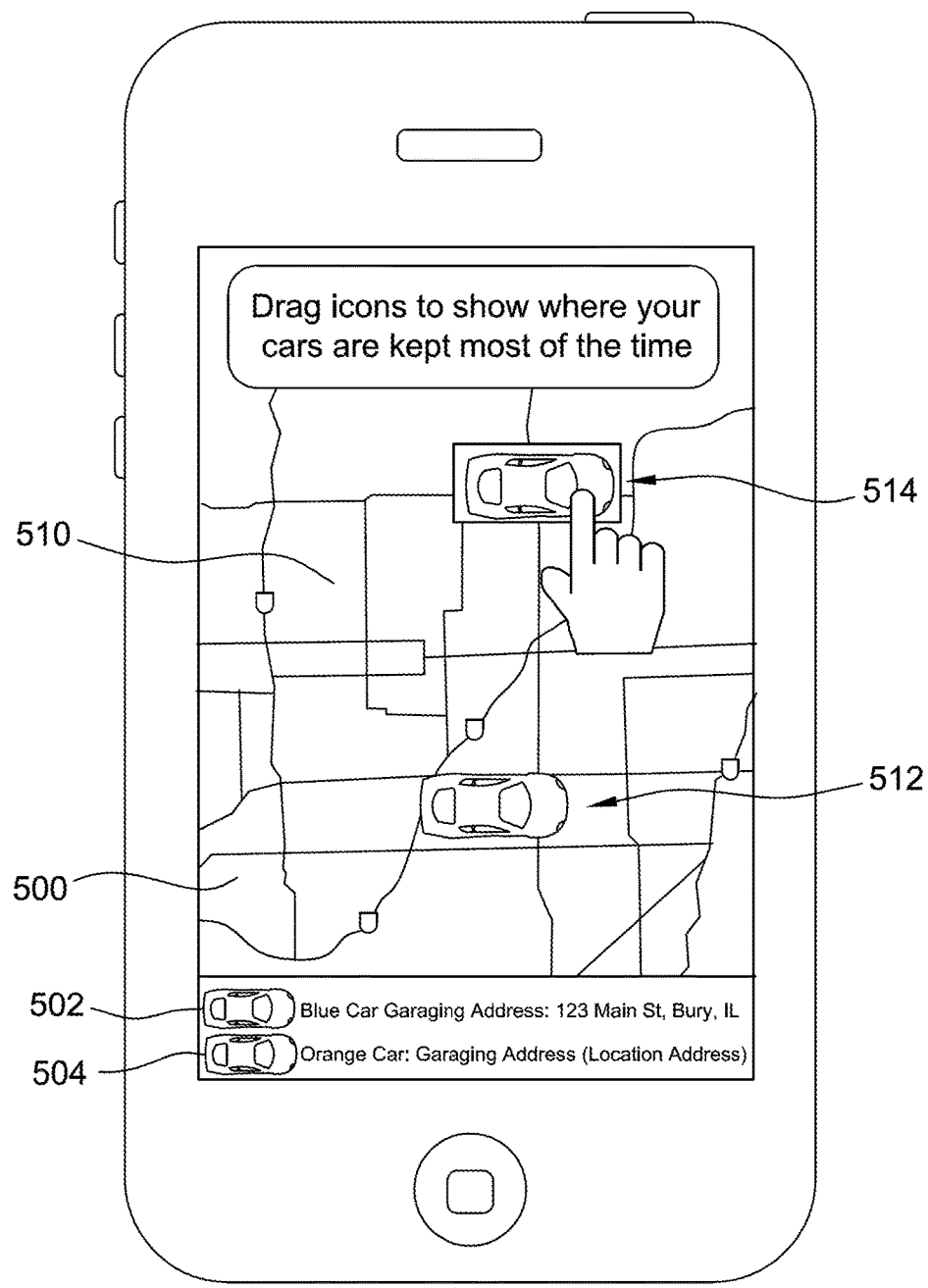
FIG. 4 depicts a schematic illustration of another exemplary embodiment of an association of a first graphical object and a second graphical object within a user interface of the user application in certain embodiments of the method shown in FIG. 1.

In certain embodiments, one of the graphical objects may not be associated with a tokenized icon. FIG. 4 is a schematic illustration of another example embodiment of an association of a first graphical object and a second graphical object within a user interface 500 of the user application. More specifically, in the illustrated embodiment, the first graphical object may be a stock image 502 of a first vehicle, and the second graphical object may be a map 510. In addition, in the illustrated embodiment, a third graphical object may be a stock image 504 of a second vehicle. For example, the stock images 502 and 504 each may represent a vehicle for which a quote for an insurance policy is requested.

For example, with reference to FIGS. 1 and 4, the user may request a quote for an insurance policy for the first and second vehicle in step 102, the insurer application may request a photograph of the VIN of the first vehicle in step 204, and may request a photograph of the VIN of the second vehicle in a repeat of step 204. The insurer application further may identify a make and model of each of the first and second vehicles based upon the corresponding VIN numbers in step 212, may select the stock images 502 and 504 of the vehicle in step 216, and may instruct the user application to use the stock images 502 and 504 as the respective icons for the first and third graphical objects in step 218. The first and third graphical objects may be associated by the insurer application with respective first and third tokenized icons that each include metadata fields for a primary garage location of the respective vehicle. The first and third tokenized icons may also include metadata fields for an owner of the vehicle, a primary driver of the vehicle, and at least one secondary driver of the vehicle, as described above.

In one embodiment, the map 510 may be embedded by the user application from a suitable third-party map application for the user device. Alternatively, the map 510 may be generated in any suitable fashion. The map 510 may display a geographical area associated with the user. For example, the third-party map application may detect a signal from the user device indicating a current geographic location of the user device. For another example, the insurer application may instruct map 510 to display a geographic location associated with the user in the internal data retrieved in step 210 and/or in the external data retrieved in step 212. For another example, the user application may prompt the user to select a geographical area for display. In some embodiments, the user application may permit the user to zoom in, zoom out, pan, and/or re-select the displayed geographic location. In response to a user interaction with the map 510, the map 510 may be configured to return data that includes an address associated with a location selected by the user.

In one embodiment, the user interface of the user application may enable the user to drag and drop the stock vehicle images 502 and 504 into association with the second graphical object, map 510, to indicate selected values for the garage location metadata associated with each of the vehicles. For example, in the illustrated embodiment, the user may associate the stock vehicle image 502 with a first address 512 of map 510, and may associate the stock vehicle image 504 with a second address 514 of map 510. The user application may report each association in step 114, and the insurer application may receive each association report in step 220 and, in response, may modify the garage location metadata associated with the first and third tokenized icons in step 222 using the address data returned by the map 510.

In some embodiments, the insurer application may then use metadata associated with the first tokenized icon representing the first vehicle and the second tokenized icon representing the second vehicle to provide the requested quote for the insurance policy for the first and second vehicles to the user application. For example, the insurer application may calculate a cost of the quoted insurance policy based in part of the garage locations of the first and second vehicles included in the metadata associated with the first and third tokenized icons.

Again, although the example embodiment is described above in terms of generating a quote for an insurance policy for a vehicle, it should be understood that alternative embodiments may be directed to generating a quote for an insurance policy for other personal property, a home, or any other suitable type of insurable asset.

Figure 5:
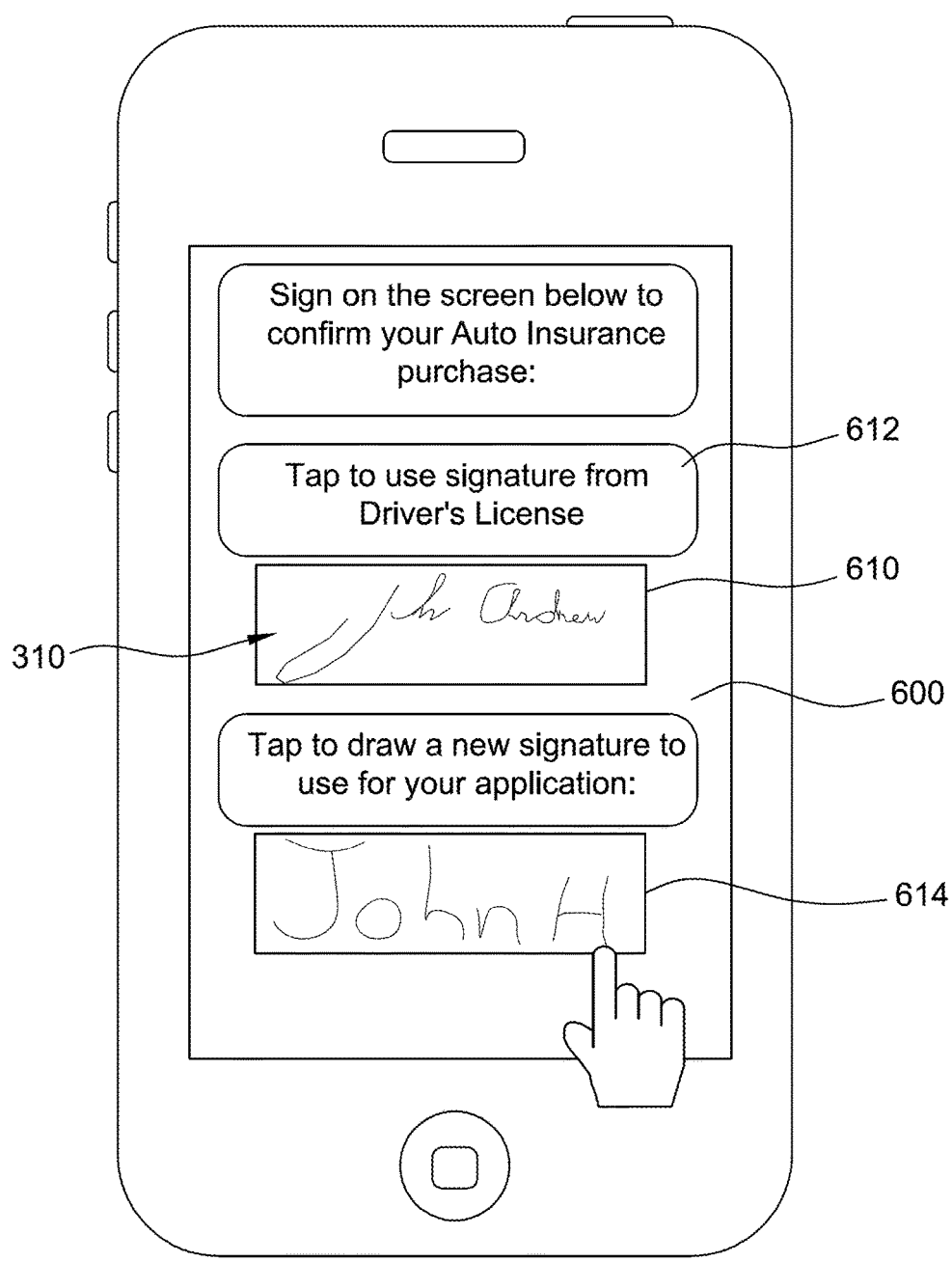
FIG. 5 depicts a schematic illustration of still another exemplary embodiment of an association of a first graphical object and a second graphical object within a user interface of the user application in certain embodiments of the method shown in FIG. 1.

In some embodiments, association of the first and second graphical objects may enable the user to complete a purchase of the quoted insurance policy. FIG. 5 is a schematic illustration of another exemplary embodiment of an association of a first graphical object and a second graphical object within a user interface 600 of the user application. More specifically, in the illustrated embodiment, the first graphical object may be the extracted signature 310 from the user's driver's license as the icon of the first tokenized icon, and the second graphical object may be an authorization button 612. For example, with reference to FIGS. 1, 2, and 5, the user may request a quote for an insurance policy for a vehicle in step 102, the insurer application may request a photograph of the user's driver's license in step 204, and the insurer application may extract the signature 310 in step 209 and select the extracted signature 310 as the associated icon in step 216. The metadata of the tokenized icon may include additional information identifying the user, and the tokenized icon may represent the user's electronic signature authorization.

In one embodiment, the user interface 600 of the user application may enable the user to associate the extracted signature 310 with the second graphical object, authorization button 612, to indicate approval of purchase of a quoted insurance policy. For example, in the illustrated embodiment, the user interface 600 may display the extracted signature 310 in a region 610 proximate the authorization button 612, and the authorization button 612 and/or other portions of the user interface 600 may include displayed text to inform the user that purchase of the quoted policy may be confirmed by selecting the authorization button 612.

The user may associate the extracted signature 310 with the authorization button 612 by selecting the authorization button 612. The user application may report the association in step 114, and the insurer application may receive the association report in step 220 and, in response, may modify the metadata associated with the first tokenized icon in step 222 to indicate that the user applied electronic signature authorization to purchase the quoted policy. In some embodiments, the user application may provide an alternative graphical object, such as a touch screen capture box 614, for the user to generate an electronic signature authorizing purchase of the insurance policy.

In certain embodiments, in response to the indication of approval of purchase of the quoted insurance policy, the insurer application may update the insurer database to reflect the purchase. For example, the insurer application may arrange to bill the user via a preferred billing method of the user indicated in the metadata associated with the first tokenized icon. In addition, the insurance policy may be generated and stored within the insurance server computing device as a template including a plurality of data fields. At least some of the data fields may be updated based on modified metadata of the first tokenized icon. For example, if the insurance policy is purchased for a vehicle or other insurable item, the insurance policy may be updated with the metadata to include information associated with the vehicle. The insurance policy may also be updated using metadata when an insurance claim is generated and/or handled.

Again, although the example embodiment is described above in terms of purchasing a quoted insurance policy for a vehicle, it should be understood that alternative embodiments may be directed to purchasing a quoted insurance policy for other personal property, a home, or any other suitable type of insurable asset.

Exemplary Use of a Tokenized Icon for Claim Handling

Figure 9:
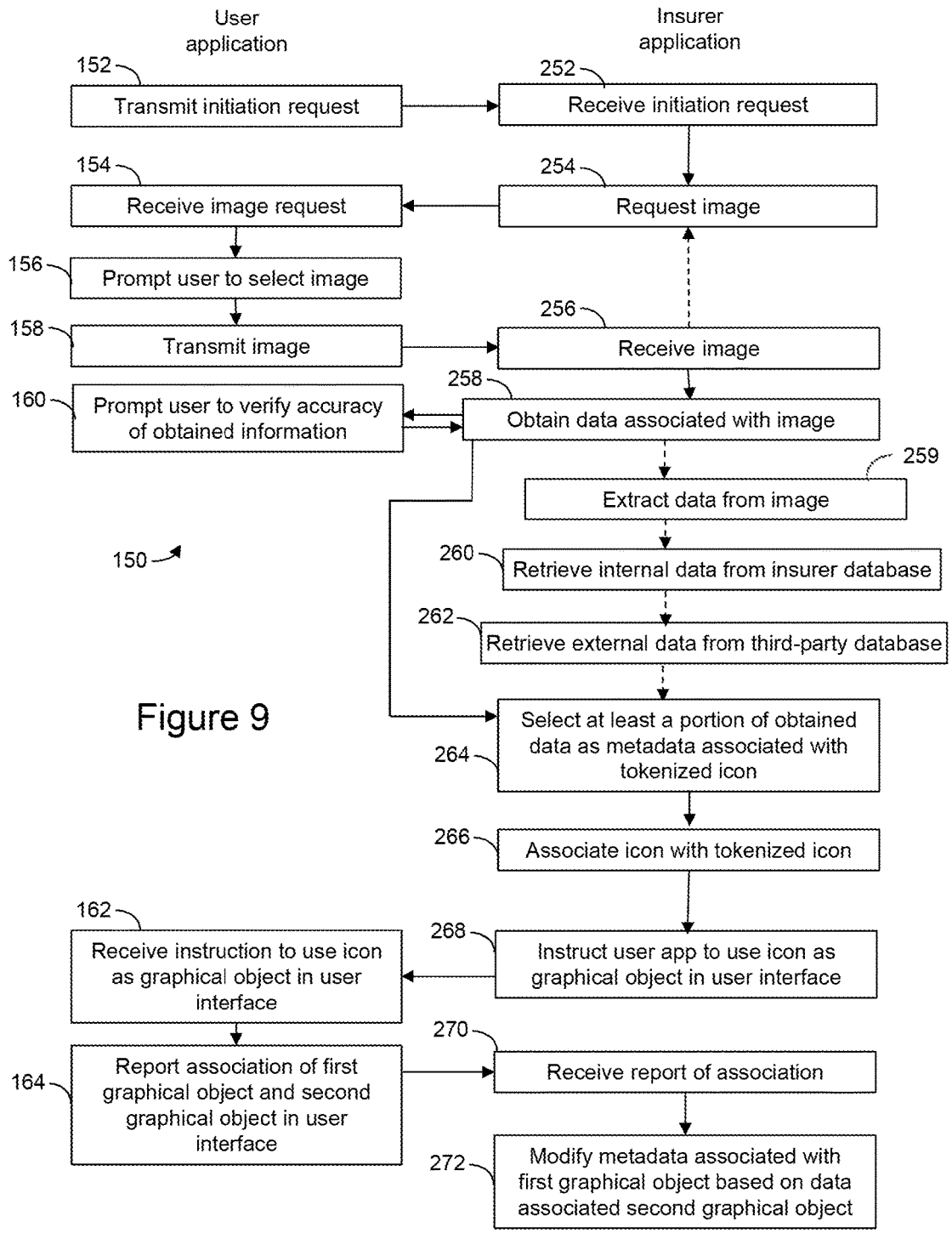
FIG. 9 depicts a schematic view of an exemplary computer-implemented method for using a tokenized icon to handle, at an insurer application, a claim made under an insurance policy using a user application.

FIG. 9 depicts a schematic view of an exemplary embodiment of a computer-implemented method 150 for using a tokenized icon to handle, at an insurer application, a claim made under an insurance policy using a user application. In certain embodiments, the insurer application may be implemented on insurance server computing device 702 (shown in FIG. 6), as will be described herein. Alternatively, the insurer application may be implemented using any suitable hardware. Moreover, in certain embodiments, the user application may be implemented on remote user computing device 802 (shown in FIG. 7), as will be described herein. In particular, in some such embodiments, the user application may be implemented on a mobile user device, such as, but not limited to, a smart phone, a tablet, wearable, smart contract, laptop, or other mobile device. Alternatively, the user application may be implemented using any suitable hardware.

In one exemplary embodiment of method 150, the user application may transmit 152 a claim initiation request to the insurer application. For example, the user application may enable a user to submit a claim under an insurance policy by clicking on a "Submit Claim" link on an insurer web page or, if the user application is a dedicated application, by clicking on a "Submit Claim" button on the user application. In certain embodiments, the user application may also transmit log-in credentials or other identification data to the insurer application. For example, the user may be an existing customer of the insurer or may have otherwise previously registered for electronic interaction with the insurer, and thus may have previously acquired log-in credentials associated with the insurer. For another example, the user application may prompt the user to enter a name, an insurance policy identifier, or other identification data.

In one exemplary embodiment, the insurer application may receive 252 the initiation request from the user application. In response to the initiation request, the insurer application may request 254 an image from the user application. The user application may receive 154 the image request from the insurer application. For example, the insurer application may request a photograph of the damaged asset, such as but not limited to a damaged portion of a home, a vehicle, or other personal property, that is the subject of the claim. For another example, the insurer application may instruct the user to send a photograph of a Vehicle Identification Number (VIN) of the vehicle that is the subject of the claim. For another example, the insurer application may instruct the user to send a photograph of the user's driver's license, as described above.

In response to the image request, the user application may prompt 156 the user to select an image. For example, the user application may prompt the user to switch to a camera application on the user device and photograph, for example, the damaged asset, such as but not limited to a damaged portion of a home, a vehicle, or other personal property, that is the subject of the claim. The user application may then provide a picture browsing window that permits the user to select the photograph of the damaged asset from a selected storage location associated with the camera application on the user device. For another example, the user application may initiate an instance of a camera application on the user device and prompt the user to photograph, for example, the damaged asset, and the user application may automatically capture the photograph returned by the camera application.

In one exemplary embodiment, the user application also may transmit 158 the image to the insurer application. More specifically, the user application may transmit an image captured by, and/or selected from, the user device in response to the image request from the insurer application. The insurer application may receive 256 the image transmitted by the user application in connection with the request to submit a claim under an insurance policy. In certain embodiments, the request for an image in step 254 may be associated with the instructions for submitting a claim in the user application, such that transmission of the image in step 158 may also constitute transmitting the initiation request in step 152. For example, the insurer application executed on an insurer web page may initially instruct the user to send a photograph of the VIN of a vehicle in order to initiate a claim submission process under an insurance policy covering the vehicle, thereby combining steps 152, 252, 154, 254, 156, 158, and 256.

In some embodiments, upon receipt of the image in step 256, the insurer application may return to step 254 to request another image, and steps 154, 156, 158, and 256 may be repeated. For example, the user may request to submit a claim under an insurance policy for a vehicle in step 152, the insurer application may request a photograph of the vehicle or the VIN of the vehicle in step 204, and after receipt of the photograph of the VIN in step 256, the insurer application may return to step 254 and request a photograph of the damaged portion of the vehicle. The insurer application may return to step 254 any suitable number of times.

In certain embodiments, the insurer application may obtain 258 data associated with the image. For example, the insurer application may extract 259 data, such as text- or image-based data, directly from the image. In one embodiment, the image is a photograph of a VIN plate of a vehicle, and the insurer application may extract 259 the VIN, in text format, from the photograph of the VIN plate. In another embodiment, the image is a photograph of the damaged asset that is the subject of the claim, and the insurer application may extract 259 data representing a location and/or an extent of the damage to the asset using suitable image analysis software. In another embodiment, the image is a photograph of the user's driver's license, and the insurer application may extract 259 data as described above with regard to FIG. 2.

Alternatively, the user application, rather than the insurance application, may obtain 258 data by extraction 259 from the image and transmit the extracted data to the insurer application. The insurer application and/or the user application may use any suitable method to extract 259 data, such as image and/or textual data, from the image.

Additionally or alternatively, the insurer application may obtain 258 data associated with the image by retrieving 260 internal data from an insurer database based upon the extracted data and/or other inputs provided by the user via the user application. More specifically, the insurer application may search the insurer database for records associated with the provided data, and retrieve internal data associated with the user or the asset that is the subject of the user's insurance claim. For example, the insurer application may retrieve internal data associated with the user and/or with the asset that is the subject of the claim.

In some such embodiments, the insurer application may retrieve a record of an applicable insurance policy associated with the user, and may instruct the user application to ask the user to verify that a claim is being made under that policy. For another example, the insurer application may search for a VIN, extracted from a received image that is a VIN photograph, in the insurer database, may retrieve a record indicating that the vehicle associated with the VIN is covered under an insurance policy with the insurer, and may ask the user to verify that a claim is being made under that policy. For another example, the insurer application may search for a driver's license number, extracted from a received image that is a photograph of the user's driver's license, in the insurer database, may retrieve a record indicating that one or more assets associated with the user are covered under an insurance policy with the insurer, and may ask the user to identify the asset for which a claim is being made.

Additionally or alternatively, the insurer application may obtain 258 data associated with the image by retrieving 262 external data from at least one third-party database based upon the extracted data and/or other inputs provided by the user via the user application. For example, the insurer application may verify personal information such as the name and current address of the user, may verify an accident or claims history of the damaged asset, and/or may retrieve other external data associated with the user and/or the asset in the at least one third-party database. For another example, the insurer application may search for a VIN extracted from a received image that is a VIN photograph in the insurer database, may retrieve a record indicating that the vehicle associated with the VIN has been involved in a previous accident or insurance claim, and may later use that information in handling the submitted claim.

In one exemplary embodiment, the user application may prompt 160 the user to verify the accuracy of the obtained data. The user may have the option to verify the accuracy of the information or to edit the obtained data using the user device. If the user edits the obtained data, the user application may then transmit the updated data back to the insurer application. In certain embodiments, an ability to obtain data from the received image reduces an amount of typing and/or other user steps that typically would be necessary to enter information such as the user's name, address, policy identifier, and/or asset description via the user application. Thus, example method 150 facilitates an improved user experience in activities such as submitting a claim under an insurance policy.

In one exemplary embodiment, the insurer application may select 264 at least a portion of the obtained data to associate as metadata with a tokenized icon. For example, the insurer application may select 264 at least one of the extracted data, the internal data, the external data, and other inputs provided by the user via the user application as metadata associated with the tokenized icon. In certain embodiments, the selected portions may be selected based upon a type or content of certain data fields included in at least one of the extracted data, the internal data, and the external data. Additionally or alternatively, the selected portions may be selected based upon data received from the user application as part of the initiation received from the user application in step 252 and/or the type of image requested from the user application in step 254.

For example, the insurer application may receive an initiation request in step 252 to submit a claim under an insurance policy for damage to an asset, and may transmit a request for an image of the user's driver's license in step 254. The insurer application may follow predetermined rules associated with insurance policy claim handling to select 214, as metadata for association with the tokenized icon, predetermined portions of at least one of the extracted data, the internal data, and the external data that are relevant to handling a claim submitted by the user.

More specifically, in some such embodiments, the insurer application may select at least one of name 304, address 306, gender 308, signature 310, license number 312, and date of birth 314 (shown in FIG. 2) from the extracted data as metadata for the tokenized icon. Additionally or alternatively, the insurer application may determine that the internal data retrieved from the insurer database reflects a name, address, gender, signature, license number, and/or date of birth associated with the user that does not match name 304, address 306, gender 308, signature 310, license number 312, and/or date of birth 314, respectively. The insurer application may transmit a request to the user application to prompt the user to resolve the conflict prior to assigning values for mismatched fields to the metadata.

The insurer application may further update incorrect or outdated internal data in the insurer database. Similarly, the insurer application may determine that the external data retrieved from at least one third-party database reflects a name, address, gender, signature, license number, and/or date of birth associated with the user that does not match name 304, address 306, gender 308, signature 310, license number 312, and/or date of birth 314, respectively. The insurer application may transmit a request to the user application to prompt the user to resolve the conflict prior to assigning values for mismatched fields to the metadata. The insurer application may further report the mismatch to the third-party database that provided the relevant external data.

Additionally or alternatively, the insurer application may select 264 from the internal data as metadata for the tokenized icon additional information such as existing or previous insurance policies associated with the user, known vehicles or other personal property assets associated with the user, telephone numbers and/or email addresses associated with the user, additional addresses associated with the user, and/or known related individuals of the user that potentially could be relevant to the insurance claim.

Additionally or alternatively, the insurer application may select 264 from the external data as metadata for the tokenized icon additional information such as known vehicles or other personal property assets associated with the user, telephone numbers and/or email addresses associated with the user, additional addresses associated with the user, property tax and/or other real estate data associated with any address of the user, a credit rating and/or credit history of the user, other public records associated with the user and/or the damaged asset, and/or other individuals associated with an address of the user.

For another example, the insurer application may receive an initiation request in step 252 to submit a claim under a vehicular insurance policy, and may transmit a request for an image of the VIN of the user's vehicle in step 254. The insurer application may follow predetermined rules associated with vehicular insurance policy claims to select 264, as metadata for association with the tokenized icon, predetermined portions of at least one of the extracted data, the internal data, and the external data that are relevant to handling a claim made under a vehicular insurance policy on the vehicle associated with the VIN.

More specifically, in some such embodiments, the insurer application may select 264 at least the VIN from the extracted data as metadata for the tokenized icon. Additionally or alternatively, the insurer application may select 264 from the internal data as metadata for the tokenized icon additional information such as existing or previous insurance policies associated with the VIN, individuals associated with the VIN, and information about any associated individuals similar to that described above for the user. Additionally or alternatively, the insurer application may select 264 from the external data as metadata for the tokenized icon additional information such as make and model of the vehicle associated with the VIN, individuals associated with the VIN, information about any associated individuals similar to that described above for the user, an accident/repair history of the vehicle associated with the VIN, and/or other public records associated with the VIN.

In one exemplary embodiment, the insurer application may associate 266 an icon with the tokenized icon. In some such embodiments, the insurer application may associate at least a portion of the image received in step 254 as the icon associated with the tokenized icon. For example, the insurer application may receive a photograph of a damaged portion of a home, in step 254, and may associate 266 the photograph of the damaged portion of the home as the icon. For another example, the insurer application may receive a photograph of a damaged vehicle in step 254, and may associate 266 the photograph of the damaged vehicle as the icon.

In other such embodiments, the insurer application may associate 266 a stock image as the icon for the tokenized icon. For example, the insurer application may receive a photograph of a damaged asset in step 254, may determine that the image may be difficult to discern as an icon-sized image, and may select a stock image representative of the asset to associate 266 as the icon. For another example, the insurer application may receive a photograph of a Vehicle Identification Number (VIN) of a vehicle in step 254, may retrieve a make and model associated with the VIN in step 262, and may associate 266 a stock image of the vehicle make and model associated with the VIN as the icon. For another example, the insurer application may receive a photograph of the user's driver's license in step 254, may retrieve internal data identifying family and/or household members associated with the user in step 260 and/or step 262, and may associate 266 a stock image of a person as the icon to represent at least one of the family and/or household members.

It should be understood that the image selected in step 266 may be re-sized, cropped, color-adjusted, contrast-adjusted, brightness-adjusted, and/or otherwise modified and/or processed in any suitable fashion by at least one of the insurer application and the user application for use as the icon.

In one exemplary embodiment, the insurer application may instruct 268 the user application to use the icon as a first graphical object in a user interface of the user application, and the user application may receive 162 the instruction. In some embodiments in which the icon is selected to be at least a portion of the received image, the user application may be configured to retrieve from a memory of the user device the image previously transmitted in step 158. In other embodiments in which the icon is selected to be at least a portion of the received image, or alternatively selected to be a stock image, the insurer application may transmit the icon to the user application in association with the instruction of step 268 for use as the first graphical object.

In certain embodiments in which the insurer application repeats step 254 and receives a plurality images, the insurer application may perform steps 258 through 268 as necessary for each of the images to generate a corresponding plurality of tokenized icons. Additionally or alternatively, the insurer application may associate obtained data from a plurality of received images with a single tokenized icon.

The user interface of the user application may enable the user to perform tasks associated with submitting a claim under an insurance policy. In particular, the user interface may enable the user to associate graphical objects with each other, such as by drag-and-drop or button operations, to communicate information relating to the submitted claim to the insurer application. Each of the graphical objects may be associated with a respective set of metadata through a respective tokenized icon, or alternatively the graphical objects may have any suitable associated data structure and/or be generated in any suitable fashion. At least a portion of the metadata associated with at least one tokenized icon may be used by the insurer application to process the submitted claim.

In one exemplary embodiment, the user application may report 164 an association in the user interface of a first graphical object and a second graphical object to the insurer application, and the insurer application may receive 220 the report of the association and, in response, modify 222 metadata associated with the first graphical object based upon data associated with the second graphical object. For example, the user interface may display the first graphical object and the second graphical object, and the user may drag and drop the first graphical object onto the second graphical object, or vice versa, within the user interface. For another example, the user interface may display the first graphical object and the second graphical object, and the user may select a button within the user interface to associate the first graphical object and the second graphical object.

The second graphical object may be associated with another tokenized icon generated by the insurer application, or alternatively may be any suitable graphical object that enables the user application to function as described herein. For example, an association of a first graphical object and a second graphical object may indicate a role and/or relationship of an individual to the asset for which the claim is being submitted. For another example, an association of a first graphical object and a second graphical object may indicate a selection of a characterization of the damage to the asset, a selection of a cause of the damage, a location of an incident associated with the damage, or any other suitable insurance claim parameter.

Figure 10:
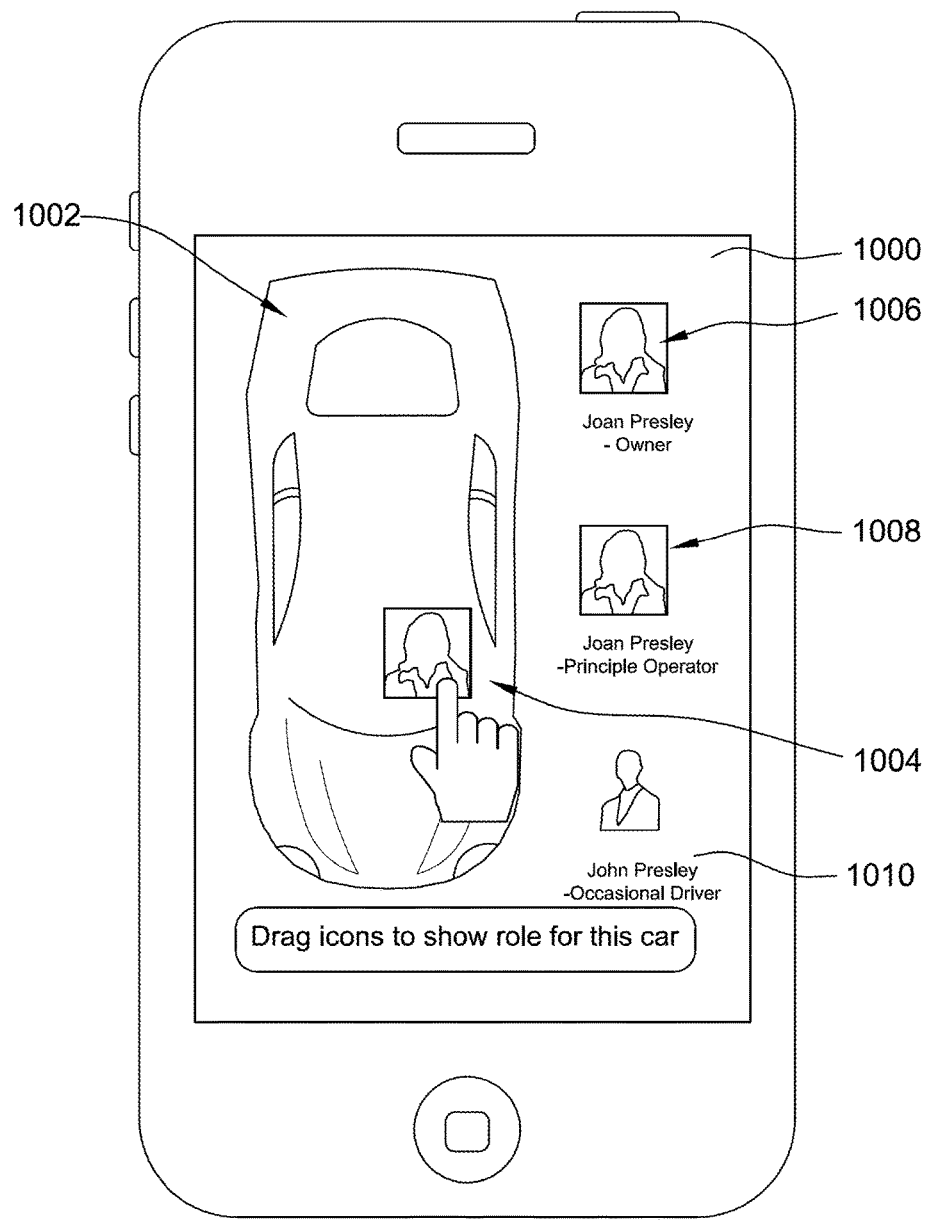
FIG. 10 depicts a schematic illustration of an exemplary embodiment of an association of a first graphical object and a second graphical object within a user interface of the user application in certain embodiments of the method shown in FIG. 9.

FIG. 10 is a schematic illustration of an exemplary embodiment of an association of a first graphical object and a second graphical object within a user interface 1000 of the user application. More specifically, in the illustrated embodiment, the second graphical object may be an image representing at least one listed driver of an insured vehicle as the icon of a second tokenized icon, and the first graphical object may be a stock image 1002 of a vehicle. The stock image 1002 may represent the vehicle for which a claim under the insurance policy is being submitted.

For example, a user may transmit a policy number via an image of an insurance card in step 158, and the insurer application may extract the policy number from the image in step 259. Alternatively, the user may transmit the policy number to the insurer application via other input in step 152. The insurer application may identify a make and model of the vehicle associated with the identified insurance policy in step 260, may associate the stock image 1002 of the vehicle in step 266, and may instruct the user application to use the stock image 1002 as the icon for the first graphical object in step 268.

For another example, a user may transmit an image of a vehicle VIN plate in step 158. The insurer application may extract the VIN from the image in step 259, may identify a make and model of the vehicle associated with the identified VIN in step 260 or step 262, may associate the stock image 1002 of the vehicle in step 266, and may instruct the user application to use the stock image 1002 as the icon for the first graphical object in step 268.

The first graphical object may be associated by the insurer application with a first tokenized icon that includes a metadata field representing an operator of the vehicle during an incident that resulted in the submitted claim, and the first graphical object may correspondingly include a designated incident operator region 1004.

The user interface may display at least one second graphical object corresponding to a potential operator of the vehicle, as listed on the insurance policy. For example, in the illustrated embodiment, the at least one second graphical object may include a stored, or alternatively a stock, image of each of a primary driver 1008 and a secondary driver 1010 listed on the insurance policy, as retrieved during step 260. Further in the illustrated embodiment, the user application may display an image of a designated owner 1006 of the vehicle to provide further confirmation to the user that the correct information has been retrieved.

In one embodiment, the user interface of the user application may enable the user to select, for example by drag and drop, one of the primary driver image 1008 and the secondary driver image 1010 into association with the stock vehicle image 1002 to indicate a selected value for the metadata associated with the first graphical object. For example, in the illustrated embodiment, the user may drag and drop the primary driver image 1008 onto the designated incident operator region 1004. The user application may report the drag and drop association in step 164, and the insurer application may receive the association report in step 270 and, in response, may modify the metadata associated with the stock vehicle image 1002 in step 272.

In some embodiments, the insurer application may then use metadata associated with the second tokenized icon representing the primary driver (or, alternatively, associated with another driver selected by the user) as part of the process of handling the submitted claim. For example, the insurer application may identify a claim settlement amount for the submitted claim based at least partially upon details of the vehicle included in the metadata associated with the first tokenized icon and/or details of the incident operator included in the metadata associated with the second tokenized icon.

Additionally or alternatively, the user interface of the user application may present additional standardized graphical objects associated with metadata that represents, for example, selectable options to indicate involvement of another vehicle in the incident, selectable triggered policy options or riders such as tow truck usage or replacement car usage, and/or any other suitable selectable insurance claim parameters. The user may associate such parameter selection graphical objects with the stock vehicle image 1002, such as by drag and drop or button operations within the user interface, and the user application may report each such association to the insurer application. The insurer application may, in response to the report of such associations, further calculate a claim settlement amount under the insurance policy for the vehicle based upon data associated with the standardized graphical objects.

Although the example embodiment is described above in terms of handling a claim under an insurance policy for a vehicle, it should be understood that alternative embodiments may be directed to handling a claim under an insurance policy for other personal property, a home, or any other suitable type of insurable asset. As just one example, in association with submitting a claim under a homeowner's policy, the user may drag and drop a standardized graphical object representing a cause of home damage, for example, an icon representing one of a fire, a water leak, a thunderstorm, or another common insurable cause of home damage, onto an image of a home, or onto an image of a room or other portion of a home, thereby causing the insurer application to modify metadata of a tokenized icon associated with the home to reflect the cause of damage. It should be understood that the user device may submit the claim information via wireless communication or data transmission over one or more radio links, or wireless or digital communication channels. Other alternative embodiments may be directed to reviewing a virtual proposed insurance claim prepared by an insurance provider remote server in response to a request received from the user mobile device, or receiving other data associated with an insurance-related event that causes damages to insured assets.

Figure 11:
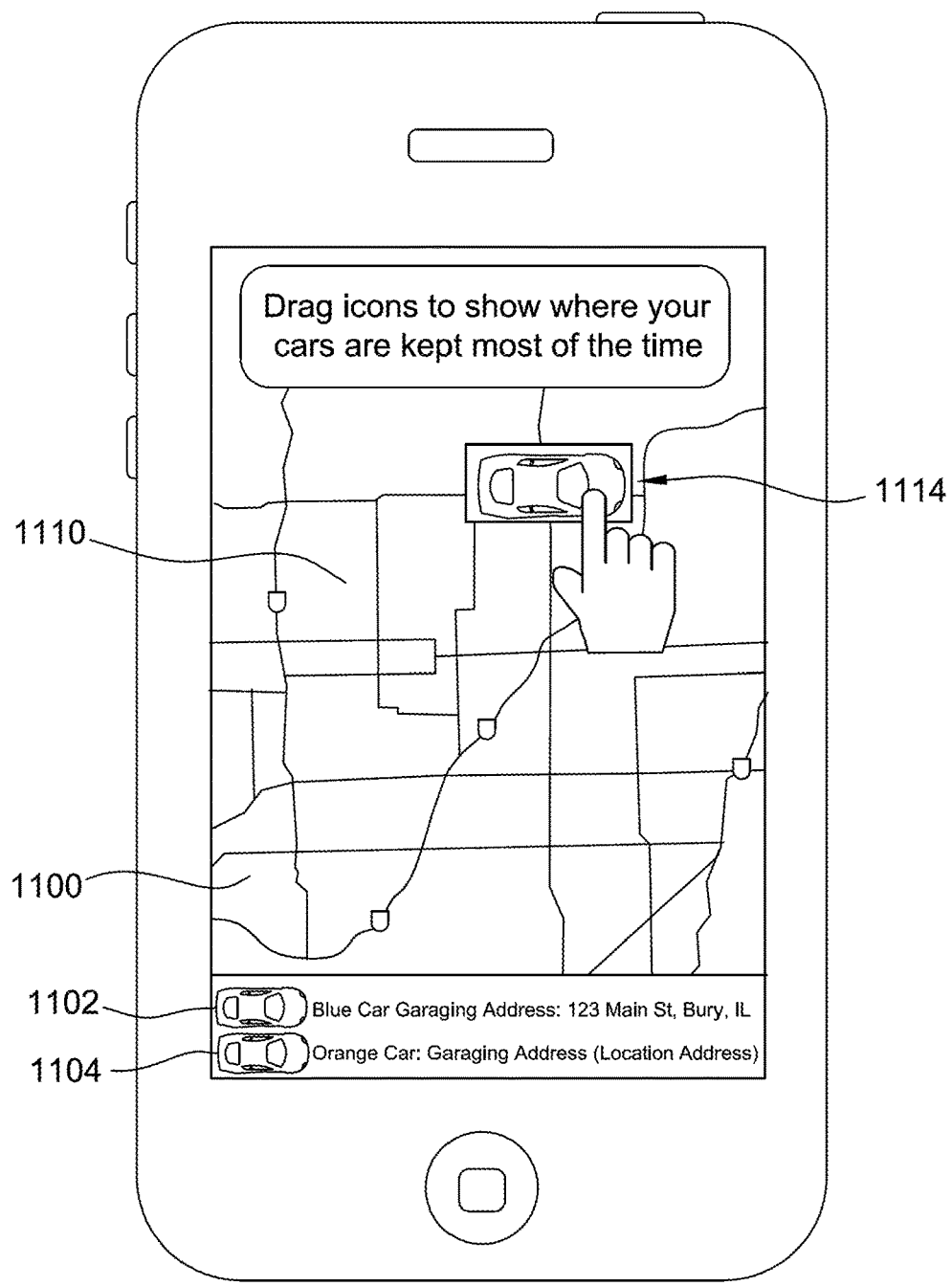
FIG. 11 depicts a schematic illustration of another exemplary embodiment of an association of a first graphical object and a second graphical object within a user interface of the user application in certain embodiments of the method shown in FIG. 9.

In certain embodiments, one of the graphical objects may not be associated with a tokenized icon. FIG. 11 is a schematic illustration of another example embodiment of an association of a first graphical object and a second graphical object within a user interface 1100 of the user application. More specifically, in the illustrated embodiment, the first graphical object may be a stock image 1102 of a first vehicle insured under a policy of a user, and the second graphical object may be a map 1110. In addition, in the illustrated embodiment, a third graphical object may be a stock image 1104 of a second vehicle insured under the policy by the user.

For example, with reference to FIGS. 9 and 11, the insurer application in step 260 may retrieve a list of vehicles insured under the policy, in step 266 may select the stock images of each vehicle based upon, for example, a make and model of each of the listed vehicles, and in step 268 may instruct the user application to use the stock images as the respective icons for graphical objects in the user interface. The user may then select the icon corresponding to the specific vehicle for which a claim under the policy is to be submitted. For example, in the illustrated embodiment, the user may select vehicle stock image 1102 to identify the associated vehicle for which a claim is to be submitted.

The selected vehicle stock image may be associated by the insurer application with a first tokenized icon that includes a metadata field for a location of a damage incident, such as a vehicle collision, associated with the claim. The first tokenized icon may also include metadata fields for an operator of the vehicle during the incident, a police report number associated with incident, a license plate of another vehicle involved the incident, or any other metadata fields suitable for association with handling of the claim.

In one embodiment, the map 1110 may be embedded by the user application from a suitable third-party map application for the user device. Alternatively, the map 1110 may be generated in any suitable fashion. The map 1110 may display a geographical area associated with the user. For example, the third-party map application may detect a signal from the user device indicating a current geographic location of the user device. For another example, the insurer application may instruct map 1110 to display a geographic location associated with the user in the internal data retrieved in step 260 and/or in the external data retrieved in step 262. For another example, the user application may prompt the user to select a geographical area for display. In some embodiments, the user application may permit the user to zoom in, zoom out, pan, and/or re-select the displayed geographic location. In response to a user interaction with the map 1110, the map 1110 may be configured to return data that includes an address associated with a location selected by the user as the location of the damage incident.

In one embodiment, the user interface of the user application may enable the user to drag and drop the selected stock vehicle image 1102 or 1104 into association with the second graphical object, map 1110, to indicate selected values for the incident location metadata associated with the submitted claim. For example, in the illustrated embodiment, the user may associate the stock vehicle image 1102 with a first address 1114 of map 1110. The user application may report the association in step 164, and the insurer application may receive the association report in step 270 and, in response, may modify the incident location metadata associated with the first tokenized icon in step 272 using the address data returned by the map 1110.

In some embodiments, the insurer application may then use metadata associated with the first tokenized icon to process the claim under the insurance policy. For example, the insurer application may confirm the incident address metadata against a police report, may confirm the incident address metadata against claimed property damage associated with the incident, may dispatch an adjustor to the incident address for further investigation, and/or may take any other suitable action associated with handling a claim submitted under an insurance policy.

Again, although the example embodiment is described above in terms of handling a claim submitted under an insurance policy for a vehicle, it should be understood that alternative embodiments may be directed to handling a claim submitted under an insurance policy for other personal property, a home, or any other suitable type of insurable asset.

In some embodiments, association of the first and second graphical objects may enable the user to approve the submission of a claim under an insurance policy, as described above with respect to FIG. 5 using the extracted signature 310 from the user's driver's license as the icon of the first tokenized icon, and an authorization button similar to authorization button 612 as the second graphical object.

In certain embodiments, in response to the indication of approval of submission of the claim, the insurer application may update the insurer database to reflect the claim is in process. For example, the insurer application may route the claim to an appropriate adjustor consistent with the type of loss indicated in the metadata associated with the first tokenized icon.

Again, although the example embodiment is described above in terms of handling a claim under an insurance policy for a vehicle, it should be understood that alternative embodiments may be directed to handling a claim under an insurance policy for other personal property, a home, or any other suitable type of insurable asset.

Exemplary Server for Implementing the Insurer Application

Figure 6:
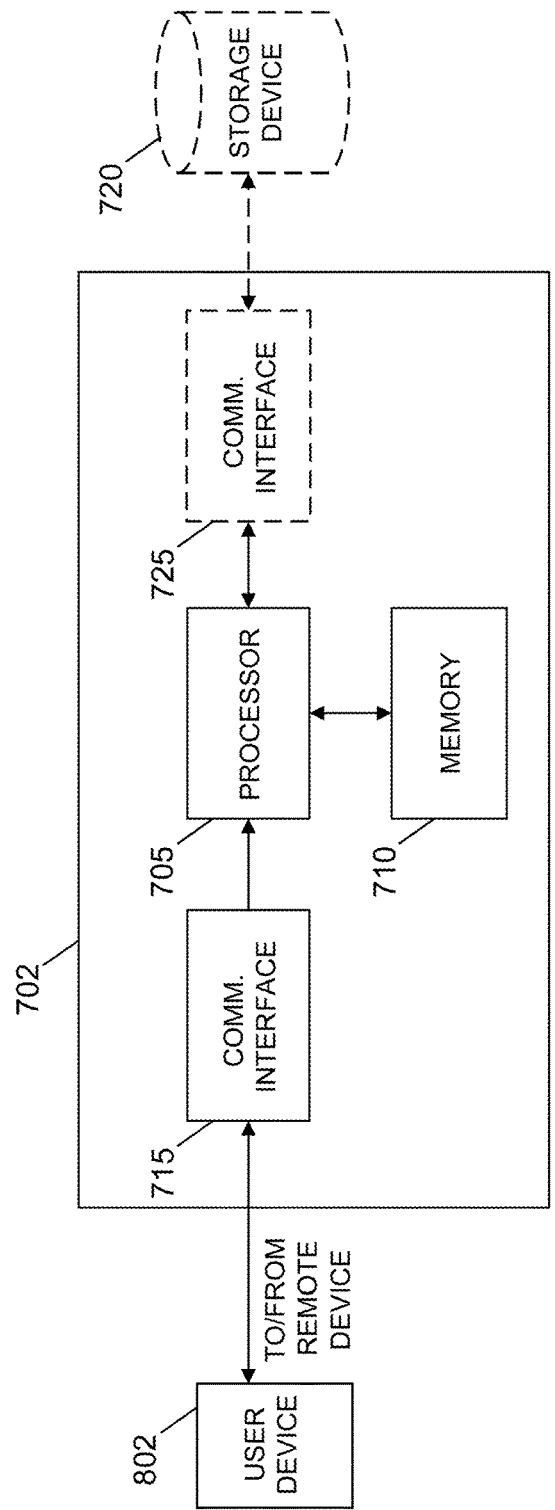
FIG. 6 depicts an exemplary embodiment of an insurance server computing device that may host the insurance application in certain embodiments of the methods shown in FIGS. 1 and 9.

FIG. 6 depicts an exemplary configuration of a server computing device 702. Server computing device 702 may be configured to implement the insurer application in embodiments of the method described above with respect to FIGS. 1-5. Alternatively or additionally, server computing device 702 may be configured to implement the insurer application in embodiments of the method described above with respect to FIGS. 9-11. Server computing device 702 may be associated with and/or maintained by an insurance provider.

Server computing device 702 may include a processor 705 for executing instructions. Instructions may be stored in a memory area 710, for example. Processor 705 may include one or more processing units (e.g., in a multi-core configuration). Memory 710 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Processor 705 may be operatively coupled to a communication interface 715 such that server computing device 702 may be capable of communicating with a remote device, such as a user computing device 802 (shown in FIG. 6) implementing the user application in embodiments of the method described above with respect to FIGS. 1-5, and/or implementing the user application in embodiments of the method described above with respect to FIGS. 9-11. For example, communication interface 715 may receive requests for quotes for insurance policies from the remote device via the Internet. For another example, communication interface 715 may receive requests to submit claims under insurance policies from the remote device via the Internet and/or via wireless communication or data transmission over one or more radio links or wireless communication channels.

Processor 705 may also be operatively coupled to at least one storage device 720. Each storage device 720 may be any computer-operated hardware suitable for storing and/or retrieving data. In some embodiments, at least one storage device 720 may be integrated in server computing device 702. For example, server computing device 702 may include one or more hard disk drives as storage device 720. In other embodiments, at least one storage device 720 may be external to server computing device 702 and may be accessed by a plurality of server computing devices 702. For example, storage device 720 may include multiple storage units, such as hard disks or solid state disks in a redundant array of inexpensive disks (RAID) configuration. Storage device 720 may include a storage area network (SAN) and/or a network attached storage (NAS) system. In certain embodiments, the insurer database in embodiments of the method described above with respect to FIGS. 1-5 and/or the method described above with respect to FIGS. 9-11 may be implemented in at least a first storage device 720, and the third-party database in embodiments of the method described above with respect to FIGS. 1-5 and/or the method described above with respect to FIGS. 9-11 may be implemented in at least a second storage device 720. The insurer database may provide reference information to processor 705, such as, for example, policy information (e.g., policy amount, premium, discount) associated with a particular insurable asset; historical informational and/or images associated with a particular insurable asset; past claims involving the insurable asset or a user associated with the insurable asset; proprietary underwriting information associated with the insurable asset and/or a corresponding policy; past claims information including past disbursement amount associated with particular damage, repair, and/or replacement; and/or other damage, repair, replacement, and/or abatement information including costs associated therewith.

In some embodiments, processor 705 may be operatively coupled to the at least one storage device 720 via at least one storage interface 725. Storage interface 725 may be any component capable of providing processor 705 with access to storage device 720. Storage interface 725 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 720.

Exemplary Mobile Device Application

Figure 7:
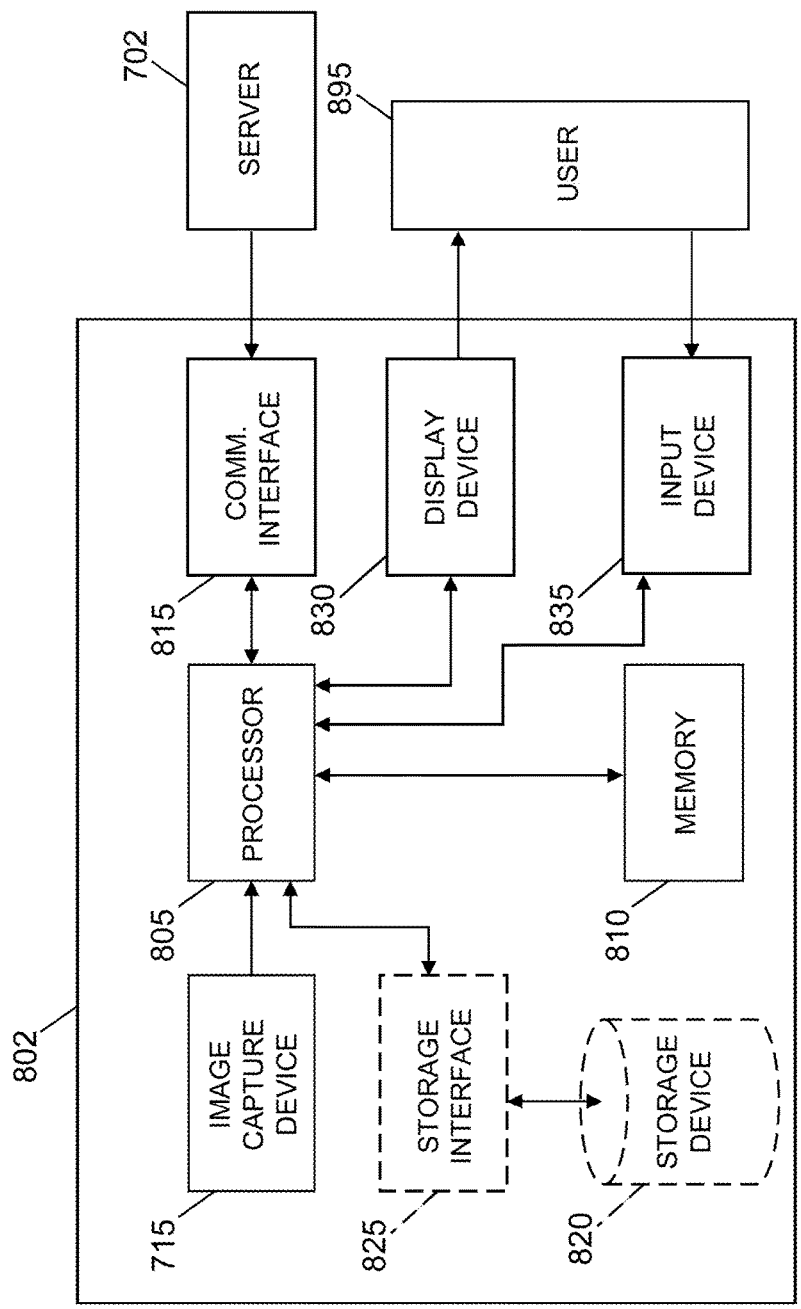
FIG. 7 depicts an exemplary embodiment of a user computing device that may host the user application in certain embodiments of the methods shown in FIGS. 1 and 9.

FIG. 7 depicts a schematic view of an exemplary user computing device 802. User computing device 802 may be configured to implement the user application in embodiments of the method described above with respect to FIGS. 1-5. Alternatively or additionally, user computing device 802 may be configured to implement the user application in embodiments of the method described above with respect to FIGS. 9-11. In one embodiment, the user computing device 802 may be any device capable of interconnecting to the Internet including a mobile computing device or "mobile device," such as a smartphone, a personal digital assistant (PDA), a tablet, a wearable device (e.g., a "smart watch" or a personal projection device such as "smart glasses"), smart contact lenses, a "phablet," or other web-connectable equipment or mobile devices. In some embodiments, the user computing device 802 may be a non-mobile device.

User computing device 802 may include a processor 805 for executing instructions. Instructions may be stored in a memory area 810, for example. Processor 805 may include one or more processing units (e.g., in a multi-core configuration). Memory 810 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Processor 805 may be operatively coupled to a communication interface 815 such that user computing device 802 may be capable of communicating with a remote device, such as server computer device 702 (shown in FIG. 6) implementing the insurer application in embodiments of the method described above with respect to FIGS. 1-5 and/or the method described above with respect to FIGS. 9-11. For example, communication interface 815 may communicate with the server device 702 via a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Processor 805 may also be operatively coupled to storage device 820. Each storage device 820 may be any computer-operated hardware suitable for storing and/or retrieving data. In some embodiments, storage device 820 may be integrated in user computing device 802. For example, user computing device 802 may include one or more hard disk drives as storage device 820. In other embodiments, at least one storage device 820 may be external to user computing device 802 and may be accessed by a plurality of user computing devices 802.

In some embodiments, processor 805 may be operatively coupled to storage device 820 via storage interface 825. Storage interface 825 may be any component capable of providing processor 805 with access to storage device 820. Storage interface 825 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 820.

In some embodiments, processor 805 may be operatively coupled to a display device 830. Display device 830 may be any component capable of conveying information to a user 895. In some embodiments, display device 830 may include an output adapter such as a video adapter and/or an audio adapter operatively coupled to processor 805. Display device 830 may include, for example, a liquid crystal display (LCD), organic light emitting diode (OLED) display, cathode ray tube (CRT), or "electronic ink" display and/or an audio output device (e.g., a speaker or headphones). In some embodiments, display device 830 may be configured to present the user application in embodiments of the method described above with respect to FIGS. 1-5 in an interactive user interface (e.g., a web browser or client application) to the user.

In some embodiments, processor 805 may be operatively coupled to an input device 835 configured to receive user input from the user 895. Input device 835 may include, for example, a touch sensitive panel (e.g., a touch pad or a touch screen), a keyboard, a pointing device, a mouse, a stylus, a camera, a gyroscope, an accelerometer, a position detector, and/or an audio input device. It should be understood that in some embodiments, a single component such as a touch screen may function as both display device 830 and input device 835. In one example embodiment, the user application may accept "screen tap" and "drop and drag" input from the user 895 via input device 835.

In some embodiments, processor 805 may be operatively coupled to an image capture device 840. In certain embodiments, image capture device 840 may be integral to user computing device 802, for example, a camera incorporated into a mobile device such as a smart phone. In other embodiments, processor 805 may be coupled to image capture device 840 via an external link. Image capture device 840 may be configured to capture one or more images of a driver's license, vehicle, VIN, and/or any other subject, such a building, room, document, person, object, and/or feature thereof.

Exemplary Tokenized Icon Use for Quote Generation

Figure 8:
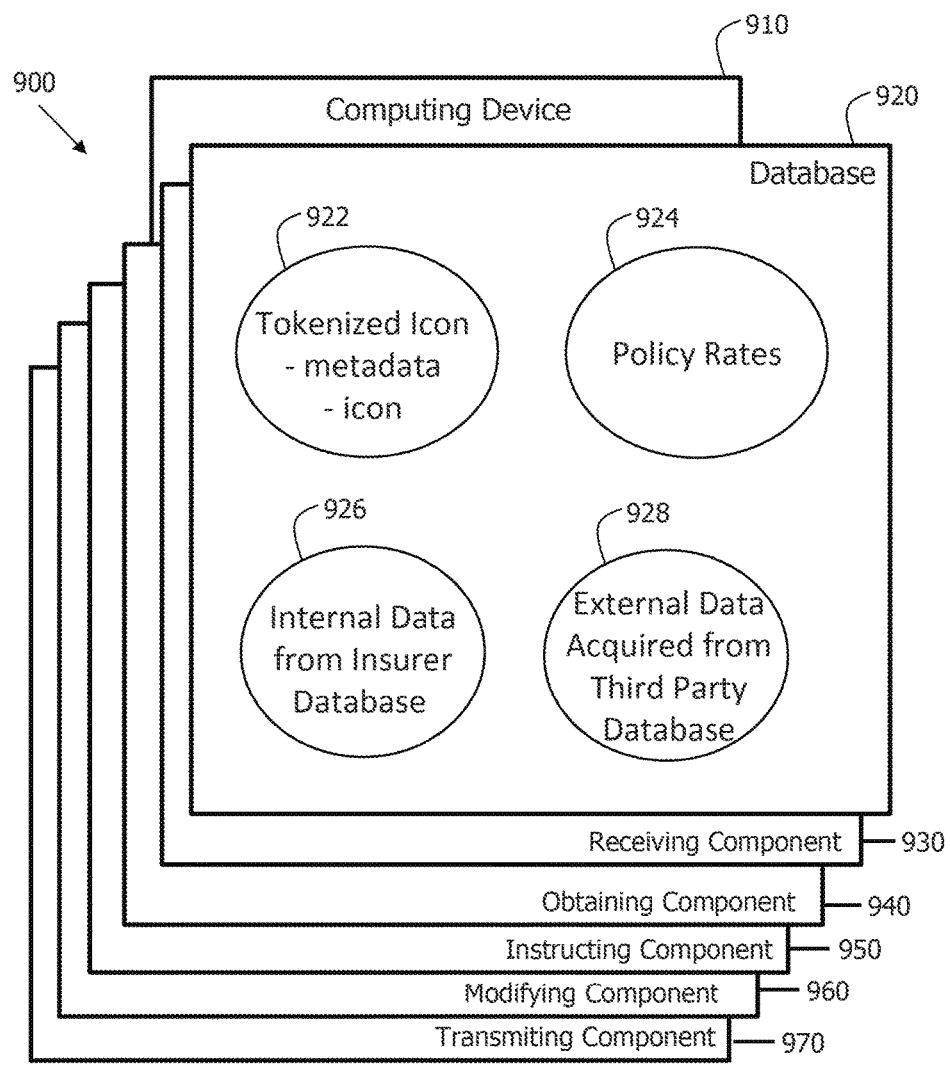
FIG. 8 depicts a diagram of components of one or more exemplary computing devices that may be used to implement the insurance application in certain embodiments of the method shown in FIG. 1.

FIG. 8 depicts a diagram 900 of components of one or more exemplary computing devices 910 that may be used to implement embodiments of the method for using a tokenized icon to provide a quote for an insurance policy, as described above with respect to FIGS. 1-5. Computing device 910 may be similar to server computing device 702 (shown in FIG. 6). FIG. 8 further shows a configuration of data in database 920, which may be similar to memory 710 and/or storage device 720 (also shown in FIG. 6). Database 920 may include, for example, metadata and an image associated with at least one tokenized icon 922, insurance policy rules 924, internal data 926 retrieved from an insurer database, external data 928 retrieved from at least one third-party database, and other data as described elsewhere herein. Database 920 may be in communication with several separate components within computing device 910, which each perform specific tasks.

More specifically, computing device 910 may include a receiving component 930 configured to receive an image from a user application in connection with a request for a quote for an insurance policy, and to make the image accessible to other components of computing device 910. Computing device 910 may also include an obtaining component 940 configured to obtain data associated with the image, such as, but not limited to internal data 926, external data 928, and/or data extracted from the image, wherein at least a portion of the obtained data is associated as metadata with the tokenized icon 922. Computing device 910 may further include an instructing component 950 configured to instruct the user application to use an icon associated with the tokenized icon 922 as a first graphical object. Computing device 910 may additionally include a modifying component 960 configured to modify, in response to an association of the first graphical object with a second graphical object in the user application, the metadata of the tokenized icon 922 based upon data associated with the second graphical object. Computing device 910 may additionally include a transmitting component 970 configured to transmit the quote to the user application, wherein the quote is based at least partially on the modified metadata of the tokenized icon 922.

Exemplary Tokenized Icon Use for Claim Handling

Figure 12:
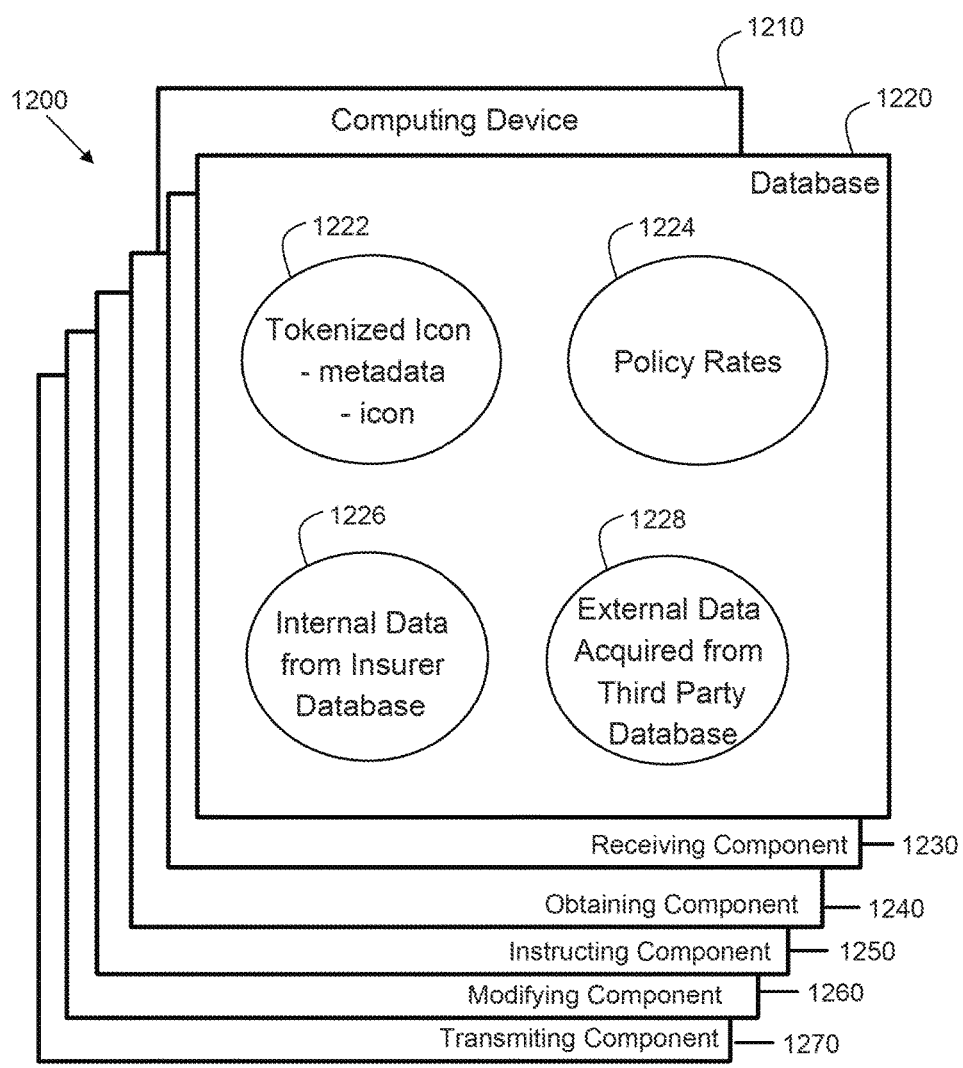
FIG. 12 depicts a diagram of components of one or more exemplary computing devices that may be used to implement the insurance application in certain embodiments of the method shown in FIG. 9.

FIG. 12 depicts a diagram 1200 of components of one or more exemplary computing devices 1210 that may be used to implement embodiments of the method for using a tokenized icon to handle a claim submitted under an insurance policy, as described above with respect to FIGS. 9-11. Computing device 1210 may be similar to server computing device 702 (shown in FIG. 6). FIG. 12 further shows a configuration of data in database 1220, which may be similar to memory 710 and/or storage device 720 (also shown in FIG. 6). Database 1220 may include, for example, metadata and an image associated with at least one tokenized icon 1222, insurance policy rules 1224, internal data 1226 retrieved from an insurer database, external data 1228 retrieved from at least one third-party database, and other data as described elsewhere herein. Database 1220 may be in communication with several separate components within computing device 1210, which each perform specific tasks.

More specifically, computing device 1210 may include a receiving component 1230 configured to receive an image from a user application in connection with a request to submit a claim under an insurance policy, and to make the image accessible to other components of computing device 1210. Computing device 1210 may also include an obtaining component 1240 configured to obtain data associated with the image, such as, but not limited to internal data 1226, external data 1228, and/or data extracted from the image, wherein at least a portion of the obtained data is associated as metadata with the tokenized icon 1222. Computing device 1210 may further include an instructing component 1250 configured to instruct the user application to use an icon associated with the tokenized icon 1222 as a first graphical object.

Computing device 1210 may additionally include a modifying component 1260 configured to modify, in response to an association of the first graphical object with a second graphical object in the user application, the metadata of the tokenized icon 1222 based upon data associated with the second graphical object. Computing device 1210 may additionally include a processing component 1270 configured to process the claim based at least partially upon the modified metadata of the tokenized icon 1222.

Machine Learning and Other Matters

In certain embodiments, the insurer application may store the images obtained from the user and provide the images to the user device in subsequent interactions with the user, thereby personalizing the experience of the user in interacting with the insurance server.

In some embodiments, the insurer application may store a photograph of the user obtained as the image from the user, and may subsequently provide the photograph of the user to agents of the insurer to facilitate recognition of the user during in-person interactions.

In certain embodiments, the insurer application may store the signature of the user extracted from, for example, an image of a driver's license, for comparison to subsequent signatures nominally provided by the user, as a fraud-detection measure.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more tokenized icons from user device details, user request or login details, user device sensors, geolocation information, image data, the insurer database, a third-party database, and/or other data.

In one embodiment, a processing element may be trained by providing it with a large sample of images and/or user data with known characteristics or features.

Based upon these analyses, the processing element may learn how to identify characteristics and patterns that may then be applied to analyzing user device details, user request or login details, user device sensors, geolocation information, image data, the insurer database, a third-party database, and/or other data. For example, the processing element may learn, with the user's permission or affirmative consent, to identify the user and/or the asset that is to be the subject of the quote or submitted claim. As a result, in response to a request for a quote or a request to submit a claim transmitted by the user, quick and automatic configuration of the tokenized icons and graphical objects to be used may prevent lengthy and potentially annoying requirements for additional user input and/or authentication.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. An insurance server for using a tokenized icon to provide a quote for an insurance policy, the insurance server comprising:
   at least one processor; and
   a memory;
   the at least one processor in communication with the memory, wherein the at least one processor is programmed to:
   receive an image from a user application in connection with a request for a quote for an insurance policy, wherein the user application is associated with a user, and wherein the image is informative and includes at least one of a photograph of a driver's license of the user, a photograph of a Vehicle Identification Number (VIN) plate of a vehicle associated with the user, a photograph of the vehicle, and a photograph of personal property associated with the user;
   obtain data associated with the image, wherein at least a portion of the obtained data is associated as metadata with the tokenized icon, and wherein the data includes at least one of a personal photograph, a name, an address, a sender, a signature, a license number, a date of birth of the user, a VIN of the vehicle, and a make and model of the vehicle from a third-party database based upon the VIN;

instruct the user application to use an icon associated with the tokenized icon as a first graphical object, wherein the icon includes one of at least a portion of the image received from the user application and a stock image, and wherein the user uses the first graphical object to associate the first graphical object with a second graphical object in the user application;

modify, in response to the association of the first graphical object with the second graphical object in the user application, the metadata of the tokenized icon based upon data associated with the second graphical object; and transmit the quote to the user application, wherein the quote is based at least partially on the modified metadata.

2. The insurance server of claim 1, wherein the at least one processor is further programmed to obtain the data associated with the image at least partially by extracting the data from the image.

3. The insurance server of claim 1, wherein the at least one processor is further programmed to obtain the data associated with the image at least partially by retrieving internal data from an insurer database.

4. The insurance server of claim 1, wherein the at least one processor is further programmed to obtain the data associated with the image at least partially by retrieving external data from a third-party database.

5. The insurance server of claim 1, wherein the at least one processor is further programmed to select a personal photograph extracted from the image of a driver's license of a user as the icon.

6. The insurance server of claim 1, wherein the at least one processor is further programmed to:
obtain the data associated with the image at least partially by extracting a Vehicle Identification Number (VIN) from the image of a VIN plate of a vehicle; and
select a stock image of the vehicle as the icon.

7. The insurance server of claim 1, wherein the at least one processor is further programmed to:
obtain the data associated with the image at least partially by identifying, in a database, at least one of a family member and a household member associated with the user; and
select a stock image of a person as the icon.

8. The insurance server of claim 1, wherein the tokenized icon is associated with a vehicle, and the at least one processor is further programmed to modify the metadata of the tokenized icon to include at least one of an owner, a primary driver, and a secondary driver indicated by the association of the first graphical object with the second graphical object that is an image of a person.

9. The insurance server of claim 1, wherein the tokenized icon is associated with a home, and the at least one processor is further programmed to modify the metadata of the tokenized icon to include at least one of an owner and a resident of the home indicated by the association of the first graphical object with the second graphical object that is an image of a person.

10. The insurance server of claim 1, wherein the tokenized icon is associated with a vehicle, and the at least one processor is further programmed to modify the metadata of the tokenized icon to include a garage location indicated by the association of the first graphical object with the second graphical object that is a map.

11. The insurance server of claim 1, wherein the tokenized icon is associated with an electronic signature authorization of a user, and the at least one processor is further programmed to modify the metadata of the tokenized icon to record a purchase of the quoted insurance policy indicated by the association of the first graphical object with the second graphical object, wherein the quoted insurance policy is updated based at least partially upon the modified metadata.

12. The insurance server of claim 1, wherein the user associates the first graphical object with a second graphical object through at least one of drag and drop and button operations.

13. A computer-implemented method for using a tokenized icon to provide a quote for an insurance policy, the method implemented using an insurance server including a processor in communication with a memory, the method comprising:

receiving an image from a user application in connection with a request for a quote for an insurance policy, wherein the user application is associated with a user, and wherein the image is informative and includes at least one of a photograph of a driver's license of the user, a photograph of a Vehicle Identification Number (VIN) plate of a vehicle associated with the user, a photograph of the vehicle, and a photograph of personal property associated with the user;

obtaining data associated with the image, wherein at least a portion of the obtained data is associated as metadata with the tokenized icon, and wherein the data includes at least one of a personal photograph, a name, an address, a gender, a signature, a license number, a date of birth of the user, a VIN of the vehicle, and a make and model of the vehicle from a third-party database based upon the VIN;

instructing the user application to use an icon associated with the tokenized icon as a first graphical object, wherein the icon includes one of at least a portion of the image received from the user application and a stock image, and wherein the user uses the first graphical object to associate the first graphical object with a second graphical object in the user application;

modifying, in response to the association of the first graphical object with the second graphical object in the user application, the metadata of the tokenized icon based upon data associated with the second graphical object; and transmitting the quote to the user application, wherein the quote is based at least partially on the modified metadata.

14. The computer-implemented method of claim 13, wherein obtaining the data associated with the image comprises extracting the data from the image.

15. The computer-implemented method of claim 13, wherein obtaining the data associated with the image comprises retrieving internal data from an insurer database.

16. The computer-implemented method of claim 13, wherein obtaining the data associated with the image comprises retrieving external data from a third-party database.

17. The computer-implemented method of claim 14 further comprising modifying the metadata of the tokenized icon to record a purchase of the quoted insurance policy indicated by the association of the first graphical object with the second graphical object, wherein the quoted insurance policy is updated based at least partially upon the modified metadata.

18. At least one non-transitory computer-readable storage media having computer-executable instructions embodied thereon, wherein when executed by an insurance server including at least one processor in communication with a memory, the computer-executable instructions cause the at least one processor to:

receive an image from a user application in connection with a request for a quote for an insurance policy, wherein the user application is associated with a user, and wherein the image is informative and includes at least one of a photograph of a driver's license of the user, a photograph of a Vehicle Identification Number (VIN) plate of a vehicle associated with the user, a photograph of the vehicle, and a photograph of personal property associated with the user;

obtain data associated with the image, wherein at least a portion of the obtained data is associated as metadata with a tokenized icon, and wherein the data includes at least one of a personal photograph, a name, an address, a gender, a signature, a license number, a date of birth of the user, a VIN of the vehicle, and a make and model of the vehicle from a third-party database based upon the VIN;

instruct the user application to use an icon associated with the tokenized icon as a first graphical object, wherein the icon includes one of at least a portion of the image received from the user application and a stock image, and wherein the user uses the first graphical object to associate the first graphical object with a second graphical object in the user application;

modify, in response to the association of the first graphical object with the second graphical object in the user application, the metadata of the tokenized icon based upon data associated with the second graphical object; and transmit the quote to the user application, wherein the quote is based at least partially on the modified metadata.

19. The at least one non-transitory computer-readable storage media of claim 18, wherein the computer-executable instructions further cause the at least one processor to modify the metadata of the tokenized icon to record a purchase of the quoted insurance policy indicated by the association of the first graphical object with the second graphical object, wherein the quoted insurance policy is updated based at least partially upon the modified metadata.

20. An insurance server for using a tokenized icon to handle a claim submitted under an insurance policy, the insurance server comprising:

at least one processor; and a memory;

the at least one processor in communication with the memory, wherein the at least one processor is programmed to:

receive an image from a user application in connection with a request to submit a claim under an insurance policy, wherein the user application is associated with a user, and wherein the image is informative and includes at least one of a photograph of a driver's license of the user, a photograph of a Vehicle identification Number (VIN) plate of a vehicle associated with the user, a photograph of the vehicle, and a photograph of personal property associated with the user;

obtain data associated with the image, wherein at least a portion of the obtained data is associated as metadata with the tokenized icon, and wherein the data includes at least one of a personal photograph, a name, an address, a gender, a signature, a license number, a date of birth of the user, a VIN of the vehicle, and a make and model of the vehicle from a third-party database based upon the VIN, a location of the vehicle, and an extent of damage to the vehicle;

instruct the user application to use an icon associated with the tokenized icon as a first graphical object, wherein the icon includes one of at least a portion of the image received from the user application and a stock image, and wherein the user uses the first graphical object to associate the first graphical object with a second graphical object in the user application;

modify, in response to the association of the first graphical object with the second graphical object in the user application, the metadata of the tokenized icon based upon data associated with the second graphical object; and process the claim based at least partially upon the modified metadata.

\* \* \* \* \*